United States Patent
Ly et al.

(10) Patent No.: US 10,727,968 B2
(45) Date of Patent: Jul. 28, 2020

(54) SYNCHRONIZATION SIGNAL BLOCK AND CONTROL RESOURCE SET MULTIPLEXING

(71) Applicant: QUALCOMM Incorporated, San Diego, CA (US)

(72) Inventors: Hung Dinh Ly, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/130,462

(22) Filed: Sep. 13, 2018

(65) Prior Publication Data

US 2019/0089474 A1    Mar. 21, 2019

Related U.S. Application Data

(60) Provisional application No. 62/559,368, filed on Sep. 15, 2017.

(51) Int. Cl.
*H04J 11/00* (2006.01)
*H04L 5/00* (2006.01)
(Continued)

(52) U.S. Cl.
CPC ........ *H04J 11/0069* (2013.01); *H04B 7/0695* (2013.01); *H04L 1/0009* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2015/0304080 A1* 10/2015 Yi .............................. H04L 1/08
                                                                370/329
2016/0105860 A1    4/2016 Li et al.
(Continued)

FOREIGN PATENT DOCUMENTS

WO    WO-2017122977 A1    7/2017

OTHER PUBLICATIONS

International Search Report and Written Opinion—PCT/US2018/051115—ISA/EPO—dated Dec. 3, 2018.

*Primary Examiner* — Robert C Scheibel
*Assistant Examiner* — Prenell P Jones
(74) *Attorney, Agent, or Firm* — Holland & Hart LLP

(57) ABSTRACT

Methods, systems, and devices for synchronization signal (SS) block and control resource set (coreset) multiplexing are described. Generally, the described techniques allow a base station to indicate, to a user equipment (UE), the location of a coreset including control information that may be used by the UE. Specifically, a base station may transmit an indication of a coreset configuration and an indication of a type of multiplexing used to multiplex the coreset with an SS block in the SS block to a UE. Accordingly, the UE may receive the SS block, and the UE may determine the location of the coreset based on the coreset configuration and the indication of the type of multiplexing used to multiplex the coreset with the SS block. The UE may then process the control information included in the coreset to identify the location of a data channel including additional system information.

30 Claims, 15 Drawing Sheets

(51) Int. Cl.
  *H04L 27/26* (2006.01)
  *H04B 7/06* (2006.01)
  *H04L 1/00* (2006.01)
  *H04W 56/00* (2009.01)
  *H04W 72/00* (2009.01)
  *H04W 48/10* (2009.01)

(52) U.S. Cl.
  CPC .......... *H04L 1/0038* (2013.01); *H04L 5/0048* (2013.01); *H04L 5/0053* (2013.01); *H04L 5/0091* (2013.01); *H04L 5/0094* (2013.01); *H04L 27/2602* (2013.01); *H04W 56/001* (2013.01); *H04W 72/005* (2013.01); *H04W 48/10* (2013.01)

(56) References Cited

U.S. PATENT DOCUMENTS

| | | | |
|---|---|---|---|
| 2017/0208592 A1* | 7/2017 | Rico Alvarino | H04W 4/70 |
| 2018/0167946 A1* | 6/2018 | Si | H04L 1/0061 |
| 2018/0183551 A1* | 6/2018 | Chou | H04L 5/0042 |
| 2018/0192383 A1* | 7/2018 | Nam | H04W 56/001 |
| 2018/0279297 A1* | 9/2018 | Nogami | H04W 72/0413 |
| 2018/0324678 A1* | 11/2018 | Chen | H04W 48/10 |
| 2019/0052379 A1* | 2/2019 | Lin | H04B 17/318 |
| 2019/0053293 A1* | 2/2019 | Akoum | H04W 76/19 |
| 2019/0132170 A1* | 5/2019 | Si | H04L 27/266 |
| 2019/0140776 A1* | 5/2019 | Seo | H04L 1/0071 |
| 2019/0289582 A1 | 9/2019 | Seo et al. | |

\* cited by examiner

SYNCHRONIZATION SIGNAL BLOCK AND CONTROL RESOURCE SET MULTIPLEXING

CROSS REFERENCE

The present Application for patent claims the benefit of U.S. Provisional Patent Application No. 62/559,368 by LY et al., entitled "SYNCHRONIZATION SIGNAL BLOCK AND CONTROL RESOURCE SET MULTIPLEXING," filed Sep. 15, 2017, assigned to the assignee hereof, and expressly incorporated by reference herein.

BACKGROUND

The following relates generally to wireless communication and more specifically to synchronization signal (SS) block and control resource set (coreset) multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support millimeter wave (mmW) communications between a base station and a UE. In order to synchronize with a base station for mmW communications, a UE may receive one or more synchronization signals in an SS block from the base station, and the UE may, for example, identify timing information from the synchronization signals to synchronize with the base station. In addition to synchronization signals, the SS block may also include system information that the UE may use to access a wireless network (e.g., through the base station). In some cases, it may also be appropriate for the UE to receive additional system information (e.g., remaining minimum system information (RMSI)) that may contain additional parameters to allow the UE to communicate with the base station. In such cases, however, the additional system information may not be transmitted in the SS block, and it may be challenging for the UE to identify the appropriate resources to monitor to receive the additional system information from the base station.

SUMMARY

The described techniques relate to improved methods, systems, devices, or apparatuses that support synchronization signal (SS) block and control resource set (coreset) multiplexing. Generally, the described techniques allow a base station to indicate, to a user equipment (UE), the location of a coreset including control information that may be used by the UE (and possibly by other UEs). Specifically, a base station may transmit an indication of a coreset configuration and an indication of a type of multiplexing used to multiplex the coreset with an SS block in the SS block to a UE. Accordingly, the UE may receive the SS block, and the UE may be able to determine the location of the coreset based on the coreset configuration and the indication of the type of multiplexing used to multiplex the coreset with the SS block. The UE may then process the control information included in the coreset to identify the location of a data channel including additional system information for the UE, and the UE may receive and use the system information for communicating with the base station.

A method for wireless communication at a UE is described. The method may include receiving an SS block including a physical broadcast channel (PBCH), identifying, from the PBCH, a coreset configuration indication which indicates a coreset configuration for a coreset that includes control information, identifying, from the PBCH, a multiplexing indication which indicates whether the coreset and the SS block are time division multiplexed, frequency division multiplexed, or both, determining the coreset based at least in part on the coreset configuration indication and the multiplexing indication, and monitoring for the control information in the coreset.

An apparatus for wireless communication is described. The apparatus may include means for receiving a SS block including a PBCH, means for identifying, from the PBCH, a coreset configuration indication which indicates a coreset configuration for a coreset that includes control information, means for identifying, from the PBCH, a multiplexing indication which indicates whether the coreset and the SS block are time division multiplexed, frequency division multiplexed, or both, means for determining the coreset based at least in part on the coreset configuration indication and the multiplexing indication, and means for monitoring for the control information in the coreset.

Another apparatus for wireless communication is described. The apparatus may include a processor, memory in electronic communication with the processor, and instructions stored in the memory. The instructions may be operable to cause the processor to receive a SS block including a PBCH, identify, from the PBCH, a coreset configuration indication which indicates a coreset configuration for a coreset that includes control information, identify, from the PBCH, a multiplexing indication which indicates whether the coreset and the SS block are time division multiplexed, frequency division multiplexed, or both, determine the coreset based at least in part on the coreset configuration indication and the multiplexing indication, and monitor for the control information in the coreset.

A non-transitory computer readable medium for wireless communication is described. The non-transitory computer-readable medium may include instructions operable to cause a processor to receive a SS block including a PBCH, identify, from the PBCH, a coreset configuration indication which indicates a coreset configuration for a coreset that includes control information, identify, from the PBCH, a multiplexing indication which indicates whether the coreset and the SS block are time division multiplexed, frequency division multiplexed, or both, determine the coreset based at least in part on the coreset configuration indication and the multiplexing indication, and monitor for the control information in the coreset.

In some examples of the method, apparatus, and non-transitory computer-readable medium described above, determining the coreset further includes identifying a type of multiplexing indicated by the multiplexing indication. Some examples of the method, apparatus, and non-transitory computer-readable medium described above may further include processes, features, means, or instructions for identifying the coreset configuration indicated by the coreset configuration indication that corresponds to the type of multiplexing.

In some examples of the method, apparatus, and non-transitory computer-readable medium described above, determining the coreset further includes identifying, based at least in part on the coreset configuration indication and the multiplexing indication, a location of the coreset. Some examples of the method, apparatus, and non-transitory computer-readable medium described above may further include processes, features, means, or instructions for determining the coreset based at least in part on identifying the location of the coreset.

In some examples of the method, apparatus, and non-transitory computer-readable medium described above, the coreset configuration indication comprises a relative position indication which indicates a relative position of the coreset in relation to the SS block when the multiplexing indication indicates that the coreset may be frequency division multiplexed with the SS block. In some examples of the method, apparatus, and non-transitory computer-readable medium described above, the relative position indication indicates whether the coreset may be above or below the SS block in a frequency domain. In some examples of the method, apparatus, and non-transitory computer-readable medium described above, the coreset may be adjacent to the SS block in a frequency domain.

In some examples of the method, apparatus, and non-transitory computer-readable medium described above, the multiplexing indication and the relative position indication may be combined as a multi-bit indicator in the PBCH. In some examples of the method, apparatus, and non-transitory computer-readable medium described above, the coreset and the SS block may be separated by a guard band. In some examples of the method, apparatus, and non-transitory computer-readable medium described above, the coreset and the SS block may be associated with different numerologies. In some examples of the method, apparatus, and non-transitory computer-readable medium described above, a center frequency of the SS block may be offset from a center frequency of the coreset by an integer number of resources blocks.

Some examples of the method, apparatus, and non-transitory computer-readable medium described above may further include processes, features, means, or instructions for determining a remaining minimum system information (RMSI) in a data channel based at least in part on the control information. In some examples of the method, apparatus, and non-transitory computer-readable medium described above, a location of the data channel may be frequency offset from a location of another downlink channel to be used for communication with a base station.

In some examples of the method, apparatus, and non-transitory computer-readable medium described above, the RMSI indicates the offset between the location of the data channel and the location of the other downlink channel. In some examples of the method, apparatus, and non-transitory computer-readable medium described above, the offset may be between a center frequency of the data channel and a center frequency of the other downlink channel. In some examples of the method, apparatus, and non-transitory computer-readable medium described above, the offset may be between a resource block at an edge of a bandwidth spanned by the data channel and a resource block at an edge of a bandwidth spanned by the other downlink channel.

Some examples of the method, apparatus, and non-transitory computer-readable medium described above may further include processes, features, means, or instructions for determining a configuration of a data channel including RMSI based at least in part on the coreset configuration. In some examples of the method, apparatus, and non-transitory computer-readable medium described above, the multiplexing indication further indicates whether a data channel including RMSI and the SS block may be time division multiplexed, frequency division multiplexed, or both.

Some examples of the method, apparatus, and non-transitory computer-readable medium described above may further include processes, features, means, or instructions for identifying, from the PBCH, an indication of a location of the coreset. Some examples of the method, apparatus, and non-transitory computer-readable medium described above may further include processes, features, means, or instructions for identifying a location of a control channel in the coreset including the control information. Some examples of the method, apparatus, and non-transitory computer-readable medium described above may further include processes, features, means, or instructions for processing the control information in the control channel based at least in part on identifying the location of the control channel in the coreset.

A method for wireless communication at a base station is described. The method may include identifying a SS block to transmit to one or more UEs, the SS block including synchronization signals and a PBCH, identifying control information to transmit to the one or more UEs in a control channel of a coreset, transmitting the SS block including the synchronization signals and the PBCH, wherein the PBCH includes a coreset configuration indication which indicates a configuration of the coreset and a multiplexing indication which indicates whether the coreset and the SS block are time division multiplexed, frequency division multiplexed, or both, and transmitting the control information to the UE in the control channel of the coreset.

An apparatus for wireless communication at a base station is described. The apparatus may include means for identifying a SS block to transmit to one or more UEs, the SS block including synchronization signals and a PBCH, means for identifying control information to transmit to the one or more UEs in a control channel of a coreset, means for transmitting the SS block including the synchronization signals and the PBCH, wherein the PBCH includes a coreset configuration indication which indicates a configuration of the coreset and a multiplexing indication which indicates whether the coreset and the SS block are time division multiplexed, frequency division multiplexed, or both, and means for transmitting the control information to the UE in the control channel of the coreset.

Another apparatus for wireless communication at a base station is described. The apparatus may include a processor, memory in electronic communication with the processor, and instructions stored in the memory. The instructions may be operable to cause the processor to identify a SS block to transmit to one or more UEs, the SS block including synchronization signals and a PBCH, identify control information to transmit to the one or more UEs in a control channel of a coreset, transmit the SS block including the synchronization signals and the PBCH, wherein the PBCH includes a coreset configuration indication which indicates a configuration of the coreset and a multiplexing indication which indicates whether the coreset and the SS block are time division multiplexed, frequency division multiplexed, or both, and transmit the control information to the UE in the control channel of the coreset.

A non-transitory computer readable medium for wireless communication at a base station is described. The non-transitory computer-readable medium may include instructions operable to cause a processor to identify a SS block to transmit to one or more UEs, the SS block including synchronization signals and a PBCH, identify control information to transmit to the one or more UEs in a control channel of a coreset, transmit the SS block including the synchronization signals and the PBCH, wherein the PBCH includes a coreset configuration indication which indicates a configuration of the coreset and a multiplexing indication which indicates whether the coreset and the SS block are time division multiplexed, frequency division multiplexed, or both, and transmit the control information to the UE in the control channel of the coreset.

In some examples of the method, apparatus, and non-transitory computer-readable medium described above, the coreset configuration indicated by the coreset configuration indication corresponds to a type of multiplexing indicated by the multiplexing indication. In some examples of the method, apparatus, and non-transitory computer-readable medium described above, the coreset configuration indication comprises a relative position indication which indicates a relative position of the coreset in relation to the SS block when the multiplexing indication indicates that the coreset may be frequency division multiplexed with the SS block. In some examples of the method, apparatus, and non-transitory computer-readable medium described above, the relative position indication indicates whether the coreset may be above or below the SS block in a frequency domain. In some examples of the method, apparatus, and non-transitory computer-readable medium described above, the coreset may be adjacent to the SS block in a frequency domain.

In some examples of the method, apparatus, and non-transitory computer-readable medium described above, the multiplexing indication and the relative position indication may be combined as a multi-bit indicator in the PBCH. In some examples of the method, apparatus, and non-transitory computer-readable medium described above, the coreset and the SS block may be separated by a guard band. In some examples of the method, apparatus, and non-transitory computer-readable medium described above, the coreset and the SS block may be associated with different numerologies. In some examples of the method, apparatus, and non-transitory computer-readable medium described above, a center frequency of the SS block may be offset from a center frequency of the coreset by an integer number of resources blocks.

In some examples of the method, apparatus, and non-transitory computer-readable medium described above, the control information indicates a location of RMSI in a data channel for the one or more UEs. In some examples of the method, apparatus, and non-transitory computer-readable medium described above, a location of the data channel may be frequency offset from a location of another downlink channel to be used for communication with the one or more UEs. In some examples of the method, apparatus, and non-transitory computer-readable medium described above, the RMSI indicates the offset between the location of the data channel and the location of the other downlink channel. In some examples of the method, apparatus, and non-transitory computer-readable medium described above, the offset may be between a center frequency of the data channel and a center frequency of the other downlink channel. In some examples of the method, apparatus, and non-transitory computer-readable medium described above, the offset may be between a resource block at an edge of a bandwidth spanned by the data channel and a resource block at an edge of a bandwidth spanned by the other downlink channel.

In some examples of the method, apparatus, and non-transitory computer-readable medium described above, a configuration of a data channel including RMSI for the one or more UEs may be based on the coreset configuration. In some examples of the method, apparatus, and non-transitory computer-readable medium described above, the multiplexing indication further indicates whether a data channel including RMSI for the one or more UEs and the SS block may be time division multiplexed, frequency division multiplexed, or both.

DETAILED DESCRIPTION

Figure 1:
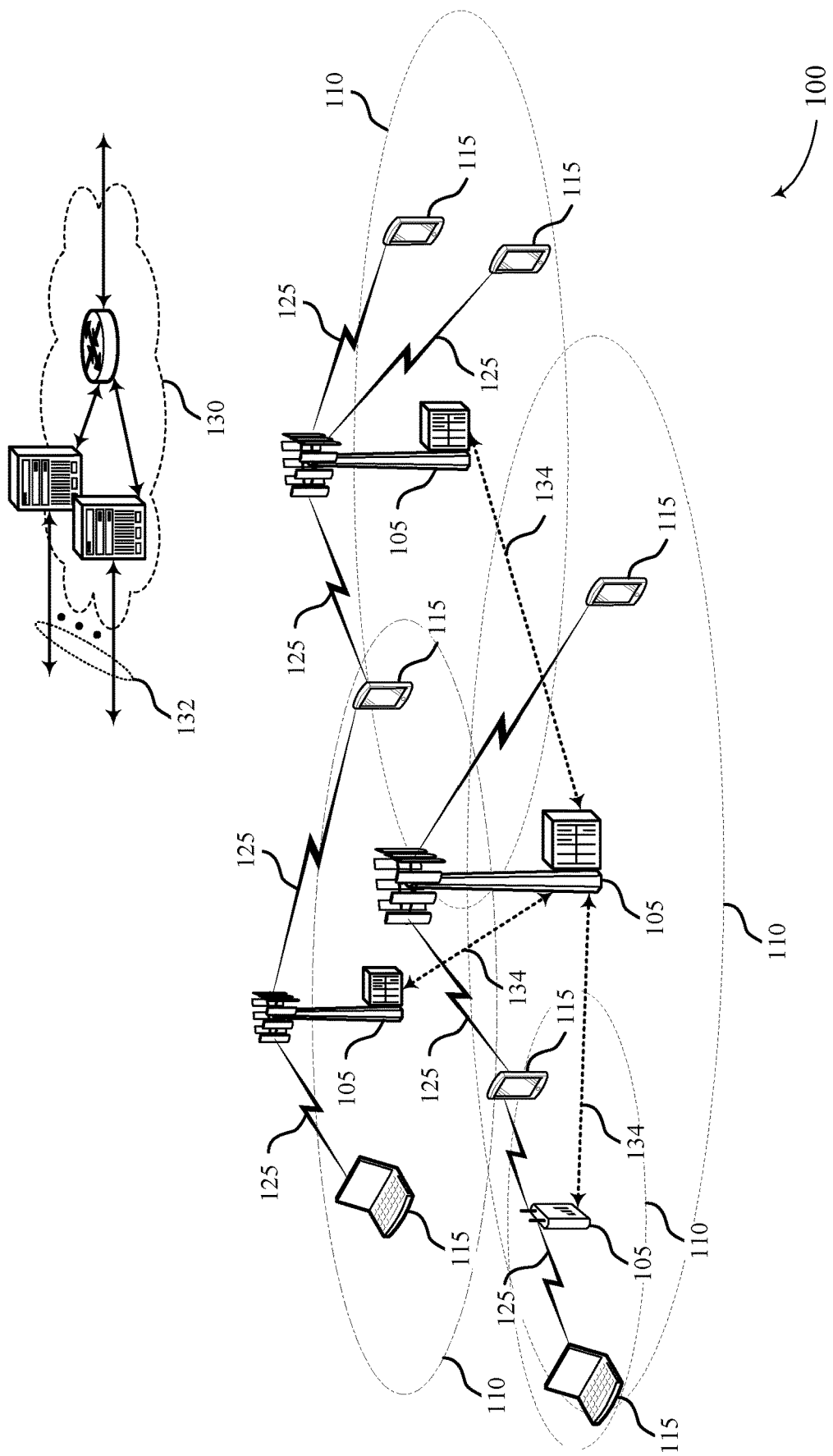
FIGS. 1 and 2 illustrate examples of wireless communications systems that support synchronization signal (SS) block and control resource set (coreset) multiplexing in accordance with various aspects of the present disclosure.

In some wireless communications systems (e.g., millimeter wave (mmW) systems), wireless devices (e.g., a base station and a user equipment (UE)) may utilize directional or beamformed transmissions (e.g., beams) to communicate with each other. In some cases, a base station may perform a beam sweep procedure to allow the base station and one or more UEs to identify appropriate beams for mmW communications. In such cases, the base station may also transmit synchronization signal (SS) blocks on each beam for one or more UEs to use to synchronize with the base station.

A UE may receive an SS block from the base station, and the UE may use the signals in the SS block to synchronize with the base station. For example, the UE may receive the synchronization signals included in the SS block, and the UE may, for example, identify timing information based on the synchronization signals that the UE may use to synchronize with the base station. The UE may also receive system information in the SS block that the UE may use to access the base station. In some cases, it may also be appropriate for the UE to receive additional system information from the base station that may contain additional parameters for communicating with the base station.

For example, a base station may transmit some system information in a physical broadcast channel (PBCH) of the SS block and other additional system information (e.g., remaining minimum system information (RMSI), which may be referred to as or conveyed in a system information block (SIB), such as SIB1) in a data channel. In such cases, the base station may transmit control information in a coreset that schedules resources for the data channel (e.g., a physical downlink control channel (PDCCH), such as i-PDCCH) that includes the additional system information. In some cases, the coreset may be a coreset to which a PDCCH carrying RMSI scheduling is mapped. In some examples, however, the coreset may be mapped to a wide range of time and frequency resources, and it may be challenging for a UE to identify the coreset such that the UE may identify the location of the data channel that includes the additional system information.

As described herein, a base station may support efficient techniques for indicating, to a UE, the appropriate resources to monitor for the coreset such that the UE may identify the location of the data channel that includes the additional system information for the UE. Specifically, the base station may transmit to the UE an indication of the coreset configuration and an indication of a type of multiplexing used to multiplex the coreset and an SS block. The UE may receive these indications in the SS block and determine the appropriate resources to monitor for the coreset based on the coreset configuration and the type of multiplexing. The UE may then process control information in the coreset to identify the location of a data channel that includes the additional system information, and the UE may receive the additional system information on the data channel to use for communications with the base station.

Aspects of the disclosure introduced above are described below in the context of a wireless communications system. Examples of processes and signaling exchanges that support SS block and coreset multiplexing are then described. Aspects of the disclosure are further illustrated by and described with reference to apparatus diagrams, system diagrams, and flowcharts that relate to SS block and coreset multiplexing.

FIG. 1 illustrates an example of a wireless communications system 100 that supports SS block and coreset multiplexing in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. A base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell ID (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Wireless communications system 100 may operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

Synchronization (e.g., for cell acquisition) may be performed using synchronization signals or channels transmitted by a synchronization source (e.g., a base station 105). A base station 105 may transmit synchronization signals containing discovery reference signals. Synchronization signals may include primary synchronization signals (PSSs) or secondary synchronization signals (SSSs). A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell ID value, which may be combined with the physical layer identity value to form the PCID, which identifies the cell. The SSS may also enable detection of a duplexing mode and a cyclic prefix (CP) length. An SSS may be used to acquire other system information (e.g., bandwidth, subframe index). The PBCH may be used to acquire additional system information needed for acquisition (e.g., bandwidth, radio frame index/number, etc.). In some cases, the PBCH may carry a master information block (MIB) and one or more system information blocks (SIBs) for a given cell.

In some wireless communications systems (e.g., in NR systems), a base station 105 may transmit SS blocks, which may contain discovery reference signals or other synchronization signals. For example, an SS block may include a PSS (e.g., one PSS symbol), an SSS (e.g., one SSS symbol), and PBCH (e.g., two PBCH symbols). In some examples, the signals included in an SS block may be time division multiplexed, such as a time division multiplexed PSS, first PBCH, SSS, and second PBCH (transmitted in the indicated order), or a time division multiplexed first PBCH, PSS, SSS, and second PBCH (transmitted in the indicated order), etc. Thus, PBCH transmissions may be transmitted in a subset of SS block time resources (e.g., in two symbols of an SS block), and synchronization signals (e.g., PSS and SSS) may be transmitted in another subset of SS block time resources.

In deployments that use mmW transmission frequencies (e.g., in NR), multiple SS blocks may be transmitted in different directions using beam sweeping in an SS burst, and multiple SS bursts may be periodically transmitted in an SS burst set. The duration of an SS burst may be referred to herein as an SS burst set measurement window. The number of directions in which the SS blocks are sent during a burst (e.g., during an SS burst set measurement window of 4 or 5 ms) may be different in different configurations, and the number of directions may also be a function of the bandwidth over which the base station 105 is operating. For example, SS blocks may be sent (e.g., beamformed) in four different directions when the base station 105 is operating in the 0-3 GHz range, in eight different directions when the base station is operating in the 3-6 GHz range, and up to 64 different directions when the base station is operating in the 6+ GHz range.

A UE 115 may receive an SS block and attempt to synchronize with a base station 105 based on the synchronization signals in the SS block and the system information in the PBCH of the SS block. In some cases, a base station may not include all of the system information for a UE 115 in the PBCH of the SS block. For example, the base station 105 may transmit some system information in the PBCH of the SS block and other additional system information (e.g., RMSI) in a data channel. In such cases, the base station may transmit control information in a coreset that schedules resources for the data channel that includes the additional system information. In some examples, however, the coreset may be mapped to a wide range of time and frequency resources, and it may be challenging for a UE 115 to identify the coreset such that the UE 115 may identify a location of a data channel that includes additional system information for the UE 115. Wireless communications system 100 may support efficient techniques for indicating, to a UE 115, a location of a coreset that the UE 115 (and possibly other UEs) may monitor for the control information described above.

Figure 2:
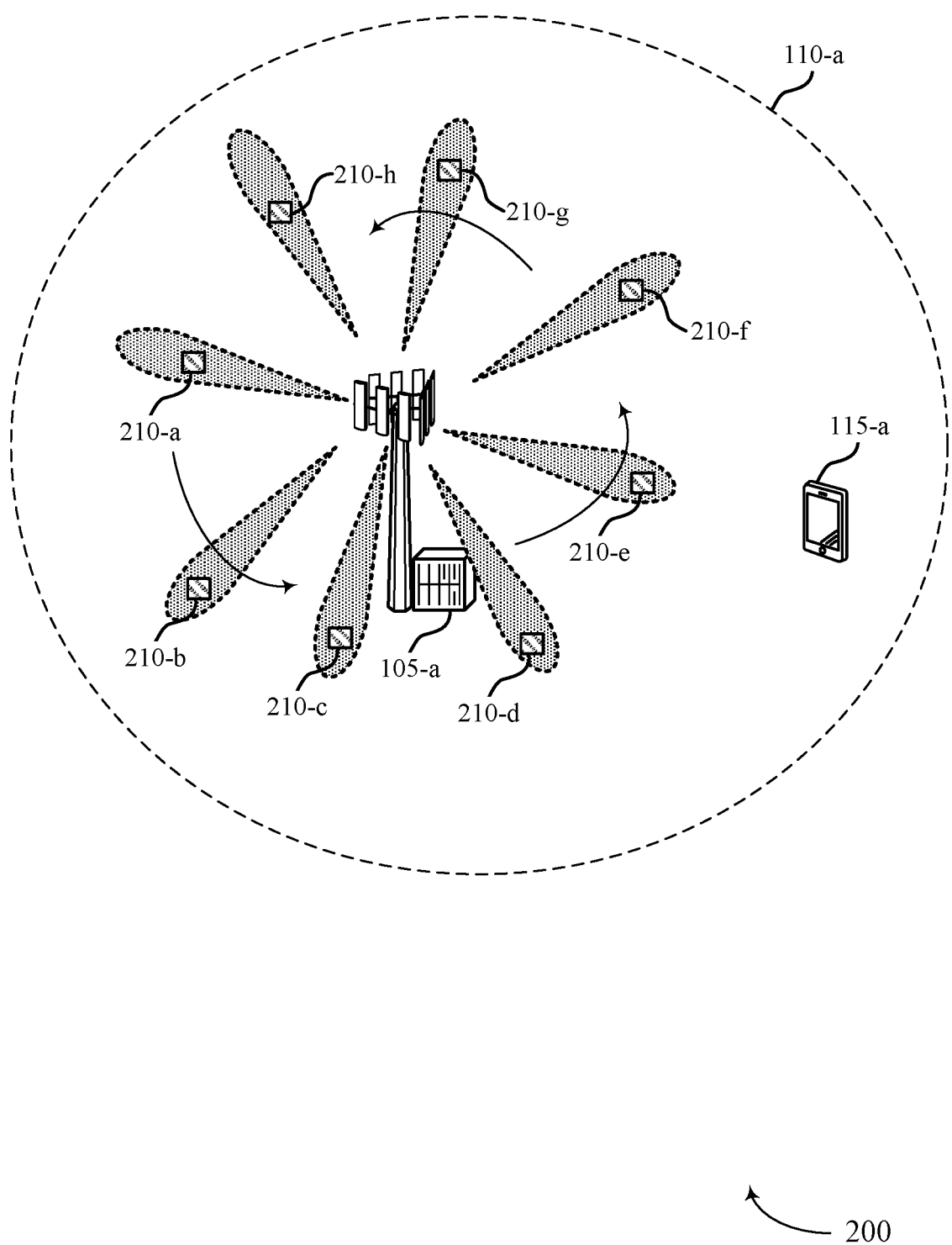

FIG. 2 illustrates an example of a wireless communications system 200 that supports SS block and coreset multiplexing in accordance with various aspects of the present disclosure. Wireless communications system 200 includes base station 105-a and UE 115-a, which may be examples of the corresponding devices described with reference to FIG. 1. Base station 105-a may communicate with wireless devices (including UE 115-a) within coverage area 110-a. Wireless communications system 200 may be an example of an mmW system. Base station 105-a may transmit a number of beamformed SS blocks 210 in different directions (e.g., in an SS burst) to facilitate cell acquisition and synchronization. In some examples, base station 105-*a* may transmit eight SS blocks 210 in eight different directions during an SS burst set measurement window of 4 ms. UE 115-*a* may receive an SS block 210 and may attempt to synchronize with base station 105-*a* based on the synchronization signals included in SS block 210.

Figure 3:
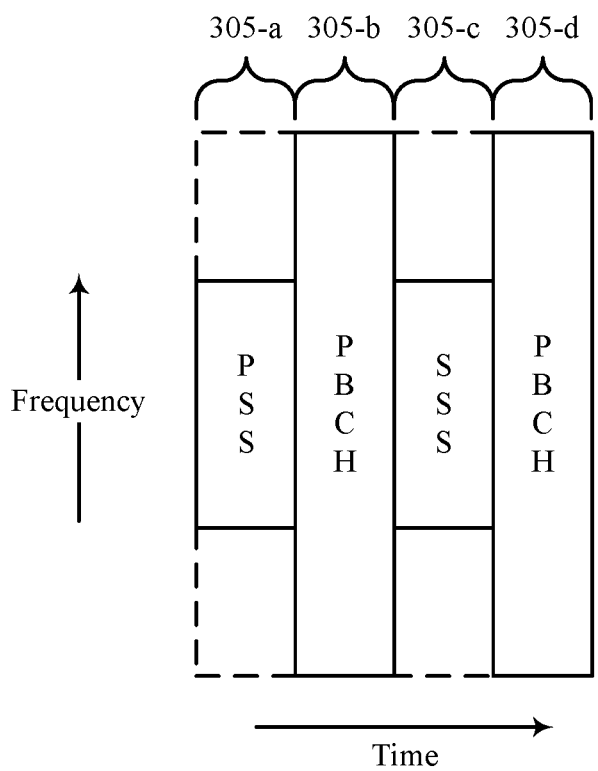
FIG. 3 illustrates an example of an SS block in accordance with various aspects of the present disclosure.

FIG. 3 illustrates an example of an SS block 210-*g* that may be transmitted by a base station (e.g., base station 105-*a*) to a UE (e.g., UE 115-*a*) in accordance with various aspects of the present disclosure. In this example, SS block 210-*g* may include a PSS in a first symbol 305-*a*, a first PBCH in a second symbol 305-*b*, an SSS in a third symbol 305-*c*, and a second PBCH in a fourth symbol 305-*d*. In other examples, however, an SS block 210 may include one or more PSSs, SSSs, and PBCHs multiplexed in various ways within the SS block. UE 115-*a* may receive SS block 210-*g* and may attempt to synchronize with base station 105-*a* based on the synchronization signals PSS, SSS included in SS block 210-*g*.

After completing initial cell synchronization based on the synchronization signals in SS block 210-*g*, UE 115-*a* may identify system information in the PBCH of SS block 210-*g* that UE 115-*a* may use to gain access to a wireless network (e.g., through base station 105-*a*). In some examples, it may also be appropriate for UE 115-*a* to receive additional system information (e.g., RMSI) from base station 105-*a* including, for example, additional parameters for UE 115-*a* to use when communicating with base station 105-*a*. Base station 105-*a* may transmit (or broadcast) the additional system information (or a portion of the additional system information) in a data channel (e.g., a physical downlink shared channel (PDSCH)) to UE 115-*a*. The location of the data channel may be indicated by control information transmitted by base station 105-*a* in a coreset.

In some wireless communications systems, however, the coreset may be mapped to a wide range of time and frequency resources, and it may be challenging for UE 115-*a* to identify the appropriate resources to monitor for the coreset. Thus, the UE 115-*a* may not be able to receive the additional system information, and, without this information, UE 115-*a* may not be able to communicate with base station 105-*a*. Base station 105-*a* may support efficient techniques for indicating, to UE 115-*a*, a location of a coreset that the UE 115-*a* (and possibly other UEs) may monitor for control information. For example, base station 105-*a* may indicate a configuration of the coreset and a type of multiplexing used to multiplex the coreset with an SS block 210, and UE 115-*a* may identify the location of the coreset based on the coreset configuration and the type of multiplexing used to multiplex the coreset with the SS block 210. UE 115-*a* may then process the control information in the coreset to determine a location of the data channel that includes the additional system information, and UE 115-*a* may receive the additional system information on the data channel.

As described herein, the coreset and the SS block may be multiplexed in various ways, and, in each case, base station 105-*a* may indicate the type of multiplexing used to multiplex the coreset with the SS block.

Figure 4A:
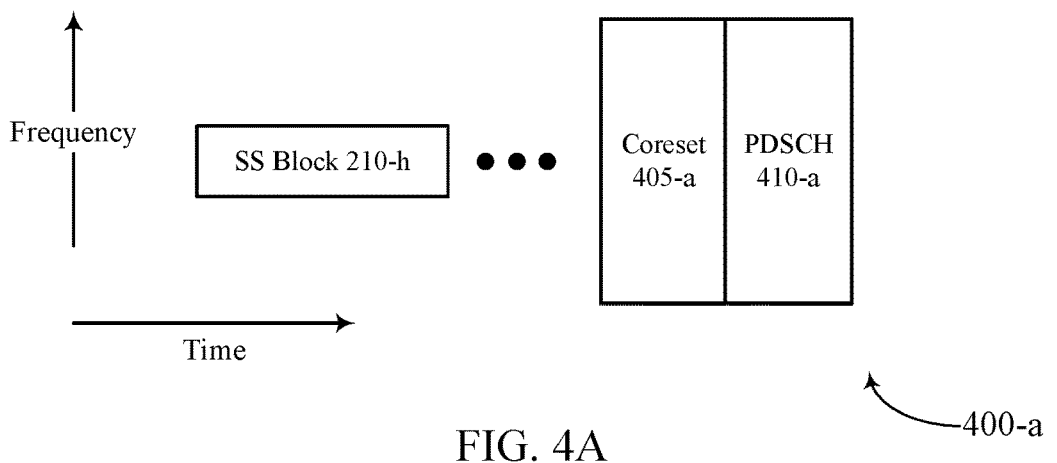
FIGS. 4A-4C illustrate example orientations of an SS block, a coreset, and a data channel in accordance with various aspects of the present disclosure.

FIG. 4A illustrates a coreset 405-*a* that is time division multiplexed with an SS block 210-*h*. In this example, base station 105-*a* may transmit, to UE 115-*a* in the PBCH of the SS block 210-*h*, an indication that the coreset is time division multiplexed with the SS block 210.

Figure 4B:
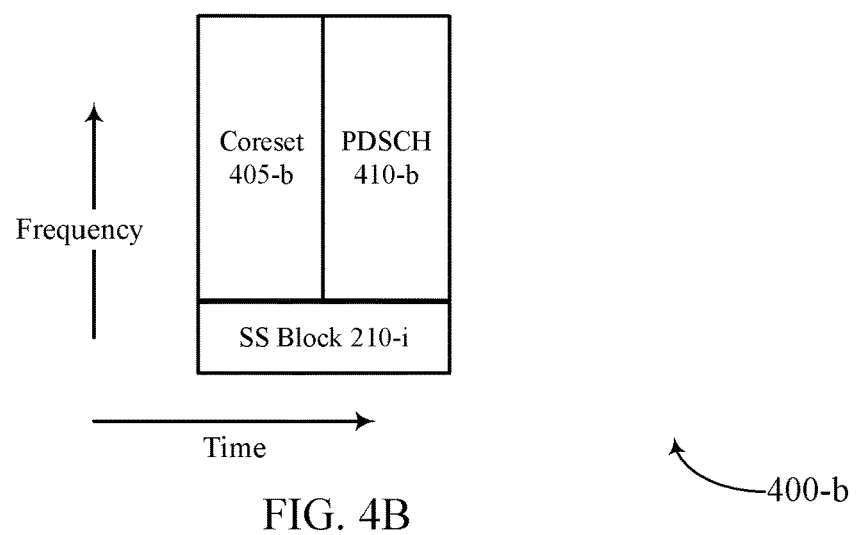

FIG. 4B illustrates a coreset 405-*b* that is frequency division multiplexed with an SS block 210-*i* such that the coreset 405-*b* is above the SS block 210-*i* in the frequency domain. In this example, base station 105-*a* may transmit, to UE 115-*a* in the PBCH of the SS block 210-*i*, an indication that the coreset is frequency division multiplexed with the SS block 210 and an indication that the coreset is above the SS block 210-*i* in the frequency domain (e.g., the coreset 405-*b* is transmitted at a higher frequency than the SS block 210-*i*).

Figure 4C:
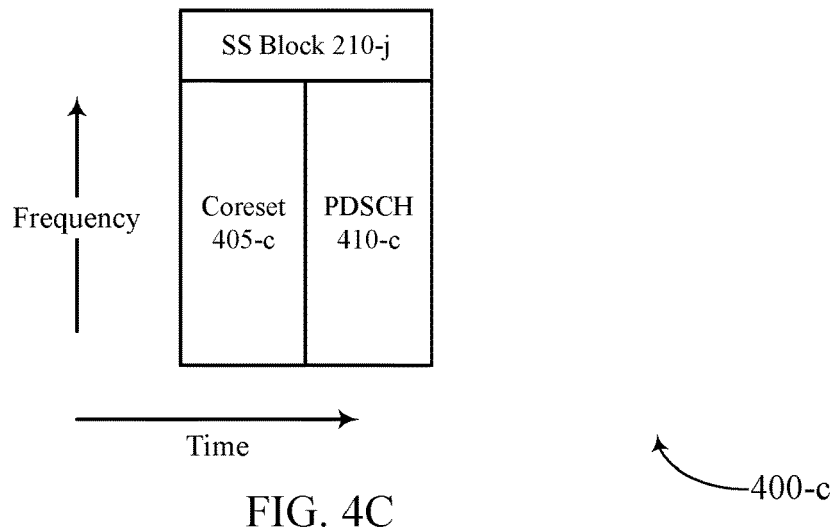

FIG. 4C illustrates a coreset 405-*c* that is frequency division multiplexed with an SS block 210-*j* such that the coreset 405-*c* is below the SS block 210-*j* in the frequency domain. In this example, base station 105-*a* may transmit, to UE 115-*a* in the PBCH of the SS block 210-*j*, an indication that the coreset is frequency division multiplexed with the SS block 210 and an indication that the coreset is below the SS block 210-*j* in the frequency domain (e.g., the coreset 405-*b* is transmitted at a lower frequency than the SS block 210-*j*).

In some cases, the indication that a coreset 405 is above or below an SS block 210 in the frequency domain may be a number whose value or sign (e.g., positive or negative) provides the indication.

Combinations of time division multiplexing and frequency division multiplexing may also be used to multiplex a coreset 405 with an SS block 210, such that the coreset 405 and SS block 210 may be both time and frequency division multiplexed.

Once UE 115-*a* receives the indication of the type of multiplexing used to multiplex the coreset 405 and the SS block 210, UE 115-*a* may use this information to identify a location of the coreset. Specifically, UE 115-*a* may receive a configuration of the coreset 405 in the PBCH of SS block 210, and, based on the coreset configuration and the type of multiplexing used to multiplex the coreset 405 and the SS block 210 (e.g., frequency division multiplexing (FDM), time division multiplexing (TDM), or both), UE 115-*a* may identify the appropriate resources to monitor for the coreset. In one example, the UE 115-*a* may have access to one or more tables that include multiple coreset configurations corresponding to different types of multiplexing. Thus, if a PBCH of SS block 210 includes an indication of a coreset configuration and a multiplexing type, the UE 115-*a* may access the table (or sub-table) corresponding to the multiplexing type and then identify a corresponding coreset configuration. In some cases, the identified coreset configuration may itself indicate to the UE 115-*a* the appropriate resources to monitor for the coreset.

Figure 5:
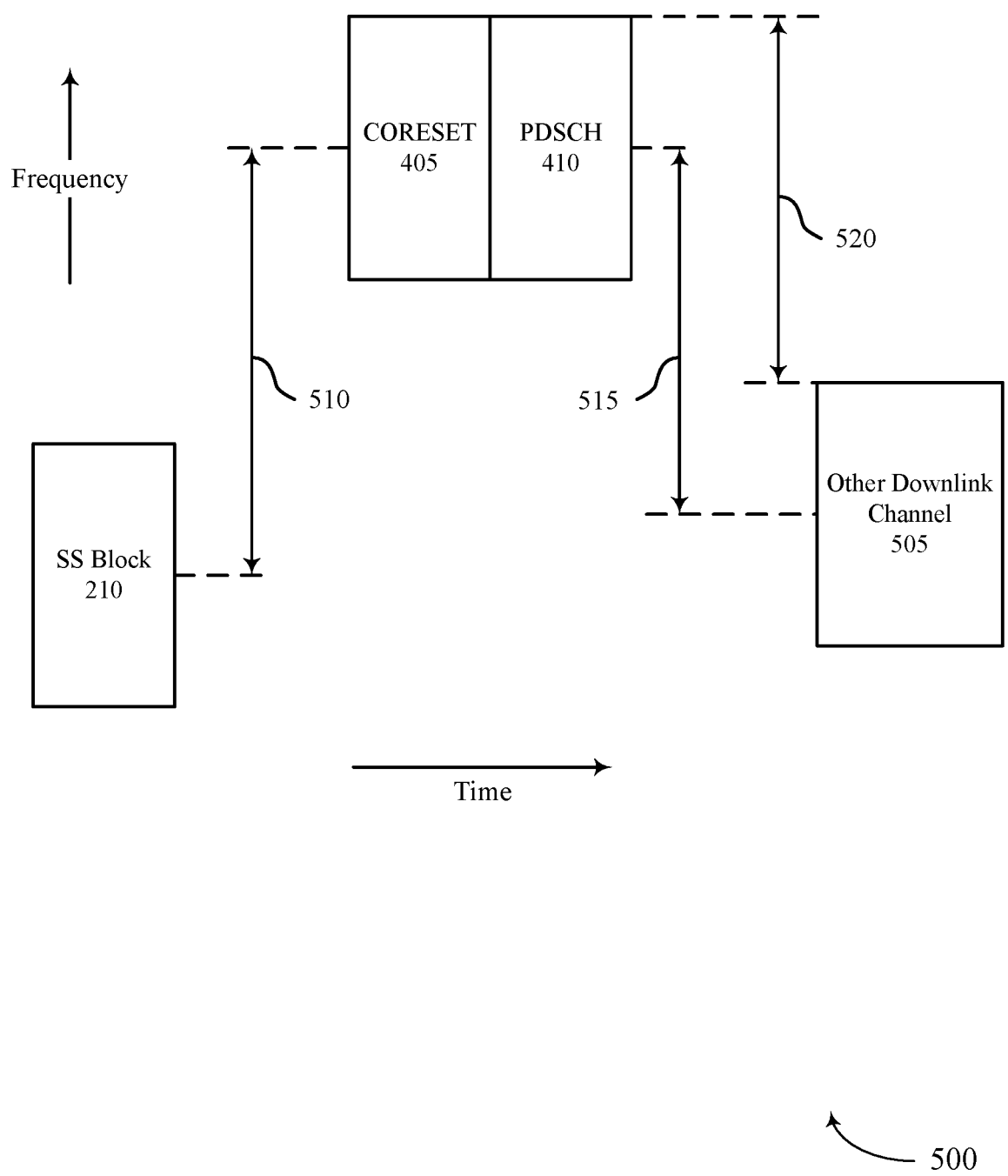
FIG. 5 illustrates an example orientation of an SS block and a coreset (and other channels) in accordance with various aspects of the present disclosure.

FIG. 5 illustrates an example orientation 500 of an SS block 210 and a coreset 405 (and other channels) in accordance with various aspects of the present disclosure. In this example, the coreset configuration (e.g., received in the PBCH of SS block 210) may indicate an offset 510 between the SS block 210 and the coreset 405 (e.g., an offset between the center frequencies of the SS block 210 and the coreset 405). As such, UE 115-*a* may identify the location of the coreset based on the indication of the offset 510 and the type of multiplexing used to multiplex the coreset 405 and the SS block 210 (e.g., TDM and FDM).

Once UE 115-*a* identifies the location of the coreset, UE 115-*a* may monitor for the control information in the coreset to identify control information transmitted by base station 105-*a* based on identifying the location of the coreset 405. For example, UE 115-*a* may perform blind detection to identify a control channel within the coreset 405 with control information for the UE 115-*a*, and UE 115-*a* may process the control information to identify the appropriate resources to monitor for a data channel (e.g., PDSCH 410) that includes additional system information for the UE 115-a. Accordingly, UE 115-a may monitor the identified resources for the data channel, and UE 115-a may receive the additional system information on the data channel. UE 115-a may then use the additional system information to communicate with base station 105-a.

In some examples, the additional system information in PDSCH 410 (e.g., RMSI or other system information (OSI)) may indicate the location of other channels (e.g., other downlink channels 505) that UE 115-a may use to communicate with base station 105-a. For example, the additional system information may indicate the location of the other channels relative to the location of the PDSCH 410. In some cases, the additional system information may indicate an offset 515 between the center frequency of PDSCH 410 and the center frequency of the other channels, and, in other cases, the additional system information may indicate an offset 520 between a resource block at an edge of a bandwidth spanned by the data channel and a resource block at an edge of a bandwidth spanned by the other downlink channel. In these examples, UE 115-a may be able to identify the location of other channels based on the additional system information in PDSCH 410, and UE 115-a may communicate with base station 105-a on the other channels.

Figure 6:
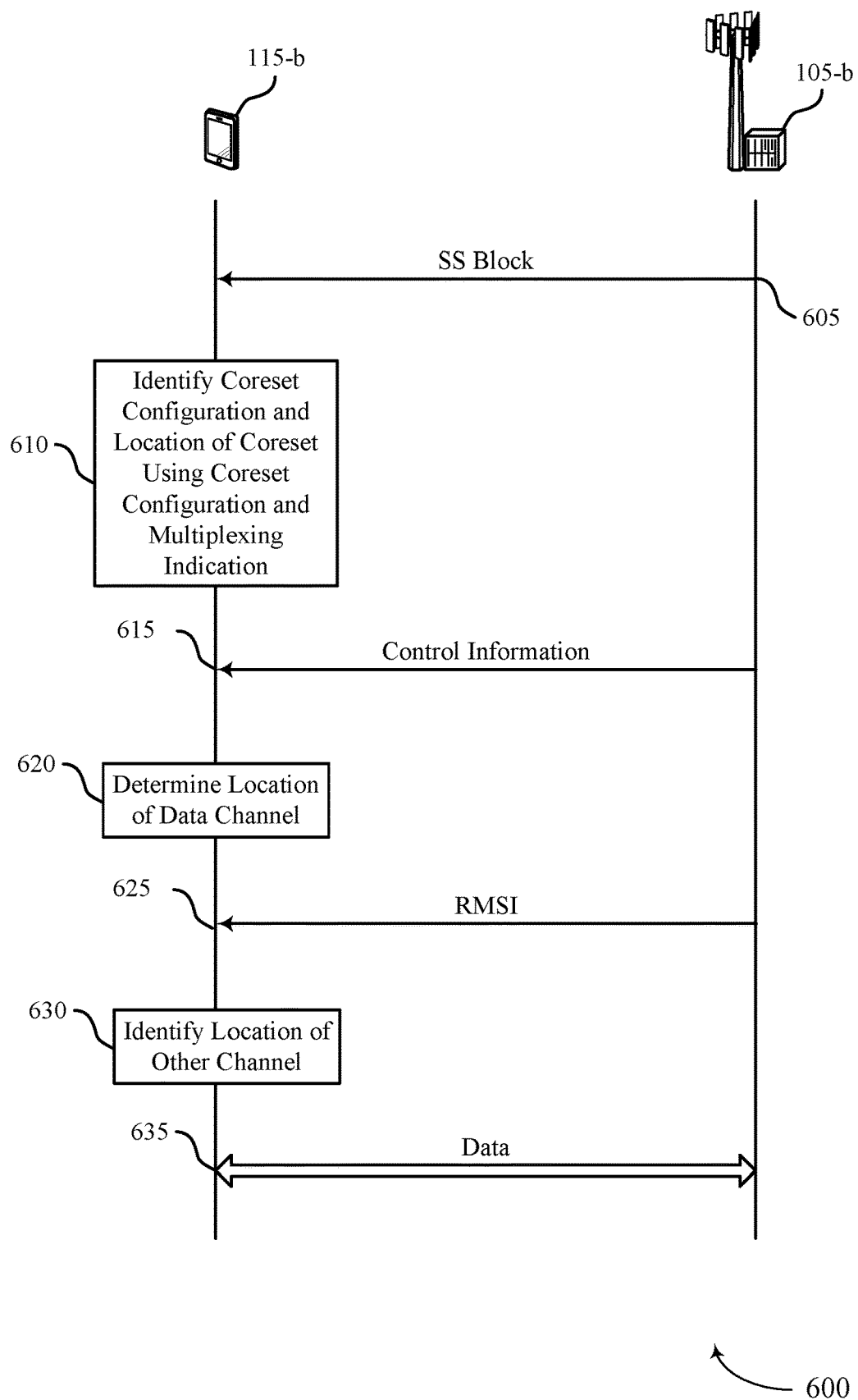
FIG. 6 illustrates an example of a process flow that supports SS block and coreset multiplexing in accordance with various aspects of the present disclosure.

FIG. 6 illustrates an example of a process flow 600 that supports SS block and coreset multiplexing in accordance with various aspects of the present disclosure. Process flow 600 illustrates aspects of techniques performed by base station 105-b, which may be an example of a base station 105 described with reference to FIGS. 1-5. Process flow 600 also illustrates aspects of techniques performed by a UE 115-b, which may be an example of a UE 115 described with reference to FIGS. 1-5.

In some cases, base station 105-b may identify an SS block including synchronization signals and a PBCH to transmit to one or more UEs (including UE 115-b). Base station 105-b may also identify control information to transmit to the one or more UEs (including UE 115-b) in a control channel of a coreset. At 605, base station 105-b may then transmit the SS block including the synchronization signals and the PBCH to UE 115-b. In some cases, the PBCH may include a coreset configuration indication which indicates a configuration of the coreset and a multiplexing indication which indicates whether the coreset and the SS block are time division multiplexed, frequency division multiplexed, or both.

UE 115-b may receive the coreset configuration indication and the multiplexing indication, and, at 610, UE 115-b may identify the configuration of the coreset and a location of the coreset based on the coreset configuration indication and the multiplexing indication. That is, UE 115-b may determine the coreset based on the coreset configuration indication and the multiplexing indication. In some examples, the coreset configuration indication may also indicate a numerology used for transmissions in the coreset, a bandwidth of a search space for UE 115-b to monitor within the coreset for control information, a center frequency of the search space for UE 115-b to monitor within the coreset for control information, the symbols of a slot that includes the coreset, and/or a periodicity associated with the transmissions of additional system information.

In some cases, UE 115-b may identify a type of multiplexing indicated by the multiplexing indication, and UE 115-b may identify the coreset configuration indicated by the coreset configuration indication that corresponds to the type of multiplexing. In some cases, UE 115-b may identify, from the PBCH, a relative position indication which indicates a relative position of the coreset in relation to the SS block when the multiplexing indication indicates that the coreset is frequency division multiplexed with the SS block. In some cases, the relative position indication indicates whether the coreset is above or below the SS block in a frequency domain. In some cases, the multiplexing indication and the relative position indication are combined as a multi-bit indicator (e.g., a two-bit indicator, a three-bit indicator, a four-bit indicator, or using some other number of bits) in the PBCH. In some cases, the relative position indication may indicate that the coreset is adjacent to (e.g., neither above nor below) the SS block in the frequency domain. In some cases, the coreset and the SS block are separated by a guard band in the frequency domain (e.g., when the coreset and the SS block are associated with different numerologies). The guard band may be a frequency band. In some cases, a center frequency of the SS block is offset from a center frequency of the coreset by an integer number of resource blocks.

At 615, UE 115-b may then receive the control information in the coreset based on identifying the location of the coreset, and, at 620, UE 115-b may determine a location of RMSI in a data channel based on the control information. In some cases, UE 115-b may determine a configuration of the data channel including the RMSI for UE 115-b based on the coreset configuration. Further, in some cases, the multiplexing indication also indicates whether the data channel including the RMSI and the SS block are time division multiplexed, frequency division multiplexed, or both. At 625, UE 115-b may then receive RMSI from base station 105-b on the data channel, and UE 115-b may identify additional parameters for communicating with base station 105-b based on the RMSI.

In some cases, the location of the data channel that includes the RMSI may be frequency offset from a location of another downlink channel to be used for communication with a base station, and the RMSI may indicate the offset between the location of the data channel and the location of the other downlink channel. In one example, the offset is between a center frequency of the data channel and a center frequency of the other downlink channel. In another example, the offset is between a resource block at an edge of a bandwidth spanned by the data channel and a resource block at an edge of a bandwidth spanned by the other downlink channel. Accordingly, at 630, UE 115-b may identify a location of another channel to be used for communications with base station 105-b based on the RMSI, and, at 635, UE 115-b may communicate with base station 105-b on the other channel.

Figure 7:
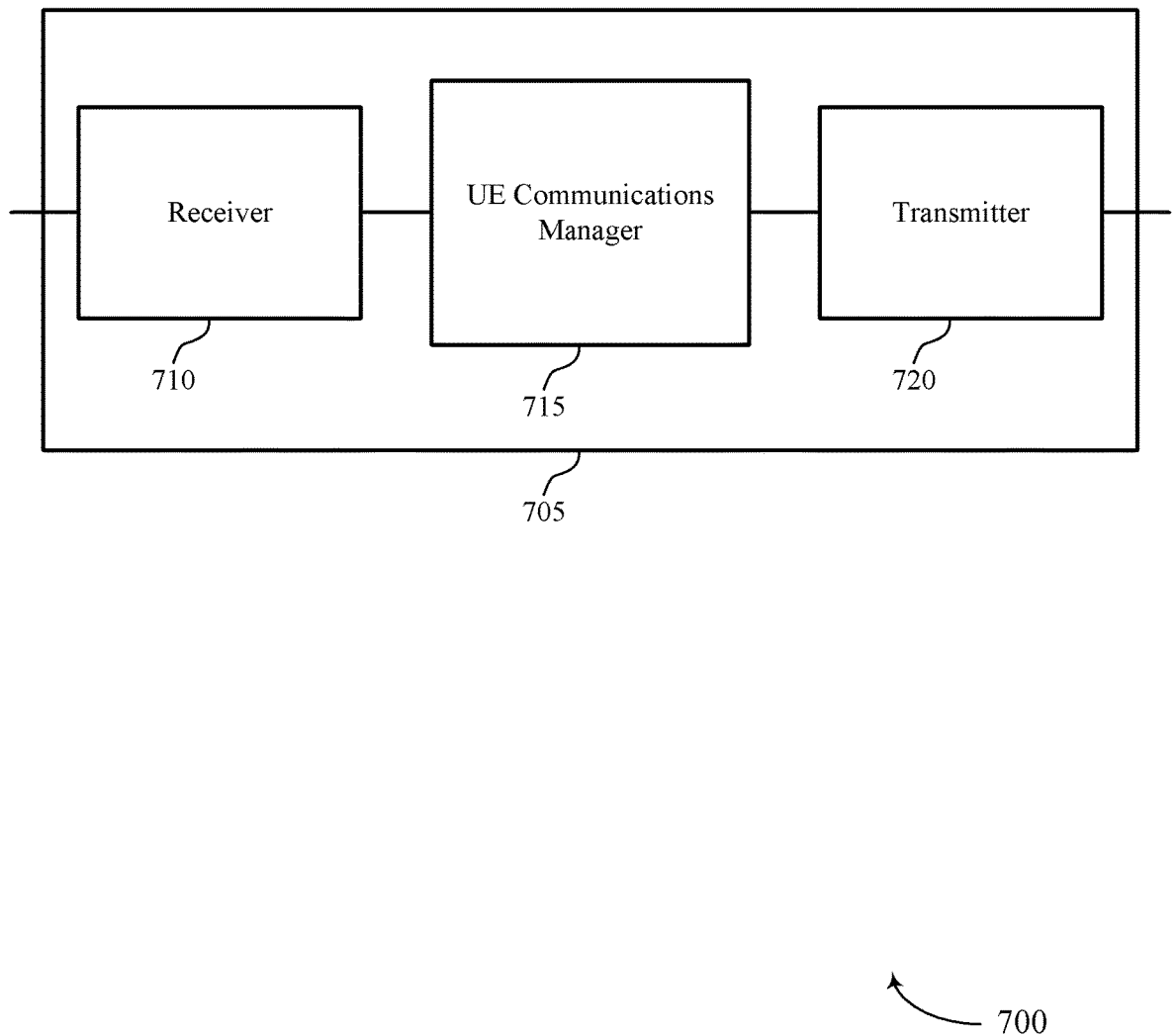
FIGS. 7-9 show block diagrams of a device that supports SS block and coreset multiplexing in accordance with various aspects of the present disclosure.

FIG. 7 shows a block diagram 700 of a wireless device 705 that supports SS block and coreset multiplexing in accordance with various aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to SS block and coreset multiplexing, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive an SS block including a PBCH, identify, from the PBCH, a coreset configuration indication which indicates a coreset configuration for a coreset that includes control information, identify, from the PBCH, a multiplexing indication which indicates whether the coreset and the SS block are time division multiplexed, frequency division multiplexed, or both, determine the coreset based on the coreset configuration indication and the multiplexing indication, and monitor for the control information in the coreset.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
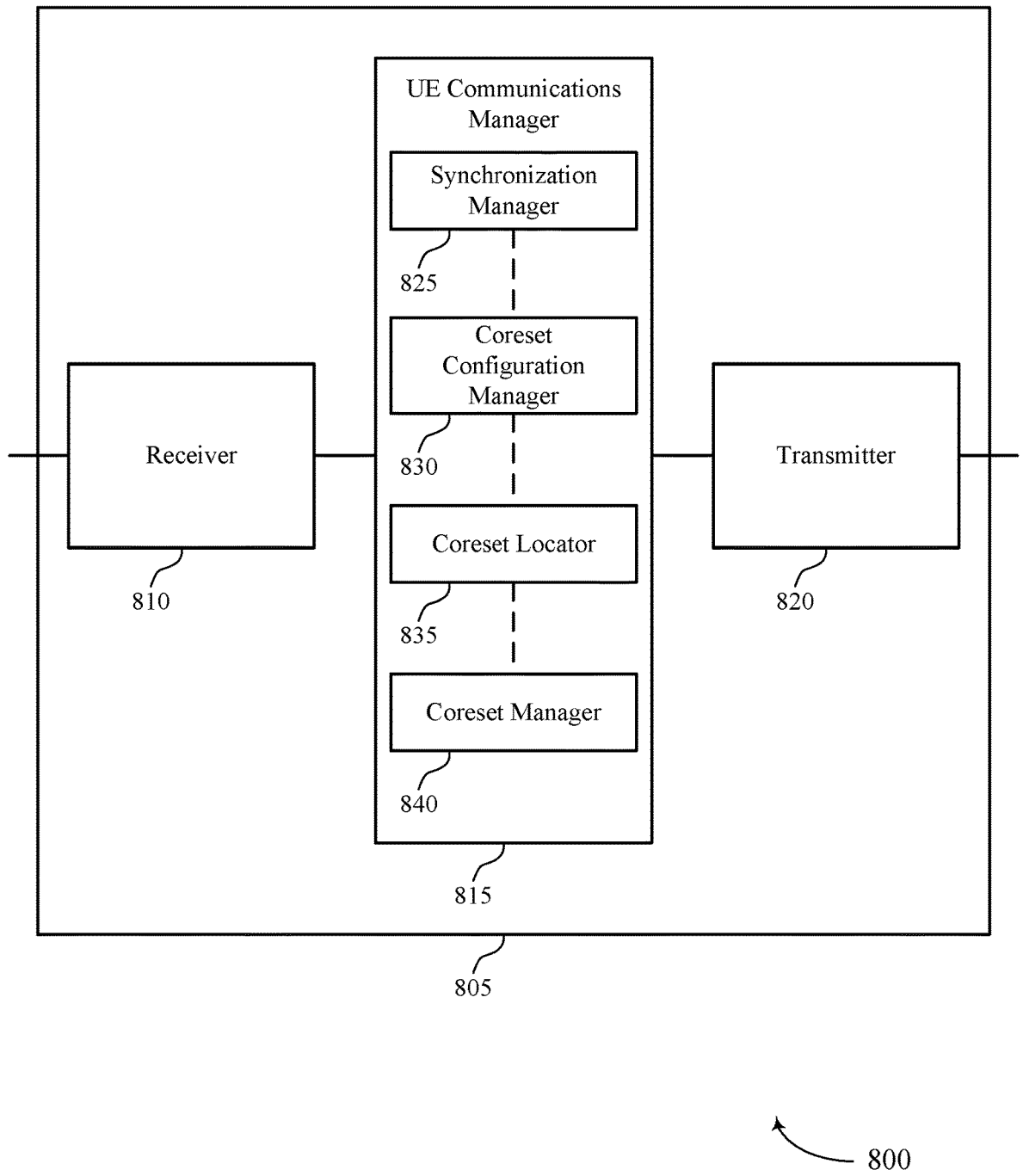

FIG. 8 shows a block diagram 800 of a wireless device 805 that supports SS block and coreset multiplexing in accordance with various aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to SS block and coreset multiplexing, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may include synchronization manager 825, coreset configuration manager 830, coreset locator 835, and coreset manager 840.

Synchronization manager 825 may receive an SS block including a PBCH. Coreset configuration manager 830 may identify, from the PBCH, a coreset configuration indication which indicates a coreset configuration for a coreset that includes control information. In some cases, coreset locator 835 may identify a type of multiplexing indicated by the multiplexing indication, and synchronization manager 825 may identify the coreset configuration indicated by the coreset configuration indication that corresponds to the type of multiplexing.

Coreset locator 835 may identify, from the PBCH, a multiplexing indication which indicates whether the coreset and the SS block are time division multiplexed, frequency division multiplexed, or both. In some cases, the coreset configuration indication includes a relative position indication which indicates a relative position of the coreset in relation to the SS block when the multiplexing indication indicates that the coreset is frequency division multiplexed with the SS block. In some cases, the relative position indication indicates whether the coreset is above or below the SS block in a frequency domain.

In some cases, the multiplexing indication and the relative position indication are combined as a multi-bit indicator in the PBCH. In some cases, the coreset is adjacent to the SS block in a frequency domain. In some cases, the coreset and the SS block are separated by a guard band. In some cases, the coreset and the SS block are associated with different numerologies. In some cases, a center frequency of the SS block is offset from a center frequency of the coreset by an integer number of resources blocks. In some cases, coreset locator 835 may identify, from the PBCH, an indication of a location of the coreset, such as a coreset configuration indication and a multiplexing indication. Coreset manager 840 may determine the coreset based on the coreset configuration indication and the multiplexing indication. Coreset manager 840 may monitor for the control information in the coreset.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
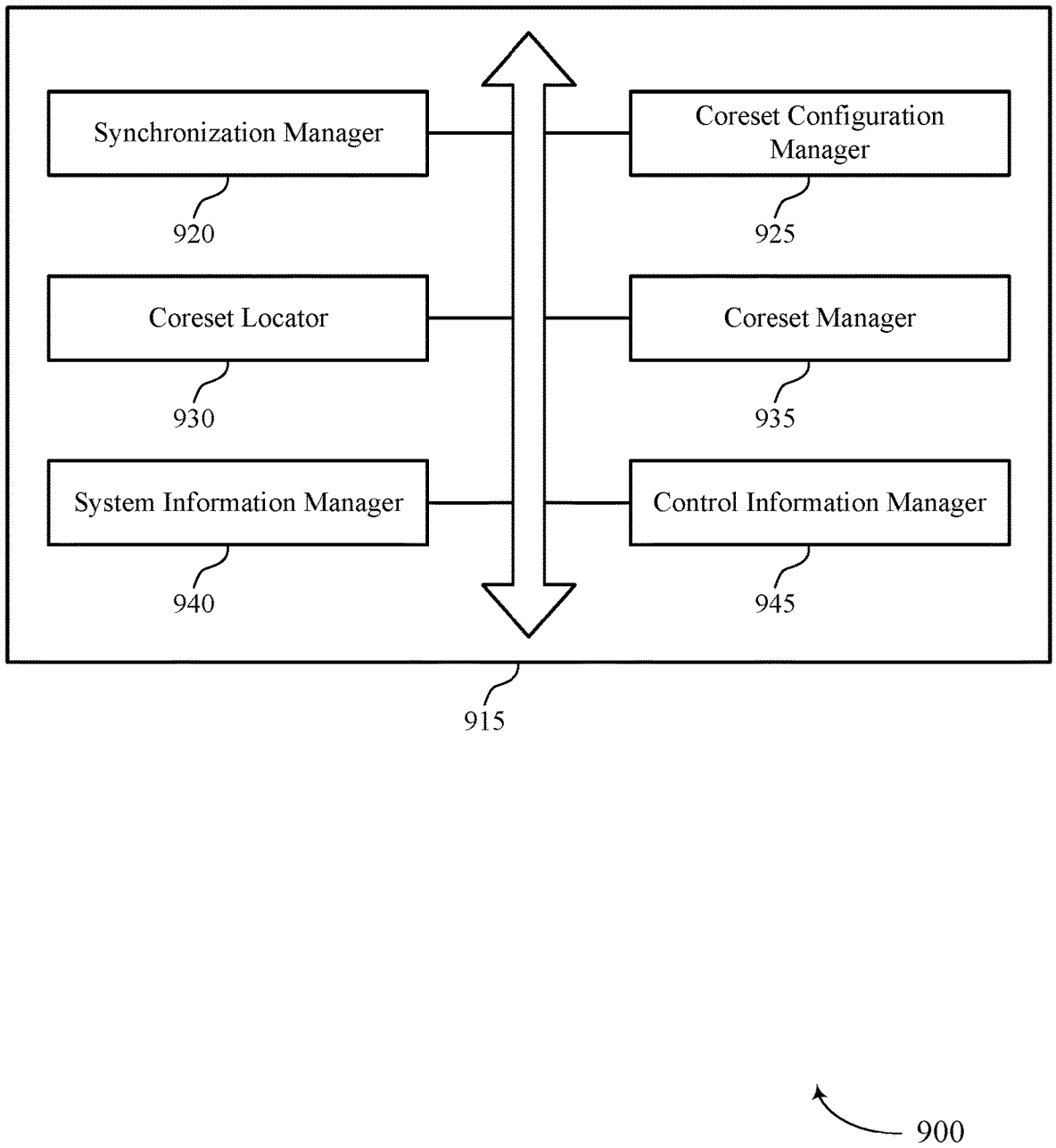

FIG. 9 shows a block diagram 900 of a UE communications manager 915 that supports SS block and coreset multiplexing in accordance with various aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include synchronization manager 920, coreset configuration manager 925, coreset locator 930, coreset manager 935, system information manager 940, and control information manager 945. Each of these modules may communicate, directly or indirectly, with one another (e.g., via one or more buses).

Synchronization manager 920 may receive an SS block including a PBCH.

Coreset configuration manager 925 may identify, from the PBCH, a coreset configuration indication which indicates a coreset configuration for a coreset that includes control information. In some cases, coreset locator 930 may identify a type of multiplexing indicated by the multiplexing indication, and coreset configuration manager 925 may identify the coreset configuration indicated by the coreset configuration indication that corresponds to the type of multiplexing.

Coreset locator 930 may identify, from the PBCH, a multiplexing indication which indicates whether the coreset and the SS block are time division multiplexed, frequency division multiplexed, or both. In some cases, coreset locator 930 may identify, from the PBCH, a relative position indication which indicates a relative position of the coreset in relation to the SS block when the multiplexing indication indicates that the coreset is frequency division multiplexed with the SS block. In some cases, the relative position indication indicates whether the coreset is above or below the SS block in a frequency domain. In some cases, the multiplexing indication and the relative position indication are combined as a multi-bit indicator in the PBCH. In some cases, the coreset is adjacent to the SS block in a frequency domain. In some cases, the coreset and the SS block are separated by a guard band. In some cases, the coreset and the SS block are associated with different numerologies. In some cases, a center frequency of the SS block is offset from a center frequency of the coreset by an integer number of resources blocks. Coreset manager 935 may determine the coreset based on the coreset configuration indication and the multiplexing indication.

System information manager 940 may determine a location of RMSI in a data channel based on the control information. In some cases, system information manager 940 may determine a configuration of the data channel including RMSI based on the coreset configuration. In some cases, the location of the data channel is frequency offset from a location of another downlink channel to be used for communication with a base station. In some cases, the RMSI indicates the offset between the location of the data channel and the location of the other downlink channel. In some cases, the offset is between a center frequency of the data channel and a center frequency of the other downlink channel. In some cases, the offset is between a resource block at an edge of a bandwidth spanned by the data channel and a resource block at an edge of a bandwidth spanned by the other downlink channel. In some cases, the multiplexing indication further indicates whether a data channel including RMSI and the SS block are time division multiplexed, frequency division multiplexed, or both.

In some cases, coreset locator 930 may identify, from the PBCH, an indication of a location of the coreset. Control information manager 945 may then identify a location of a control channel in the coreset including the control information for the UE and process the control information in the control channel based on identifying the location of the control channel in the coreset. Control information manager 945 may monitor for the control information in the coreset.

Figure 10:
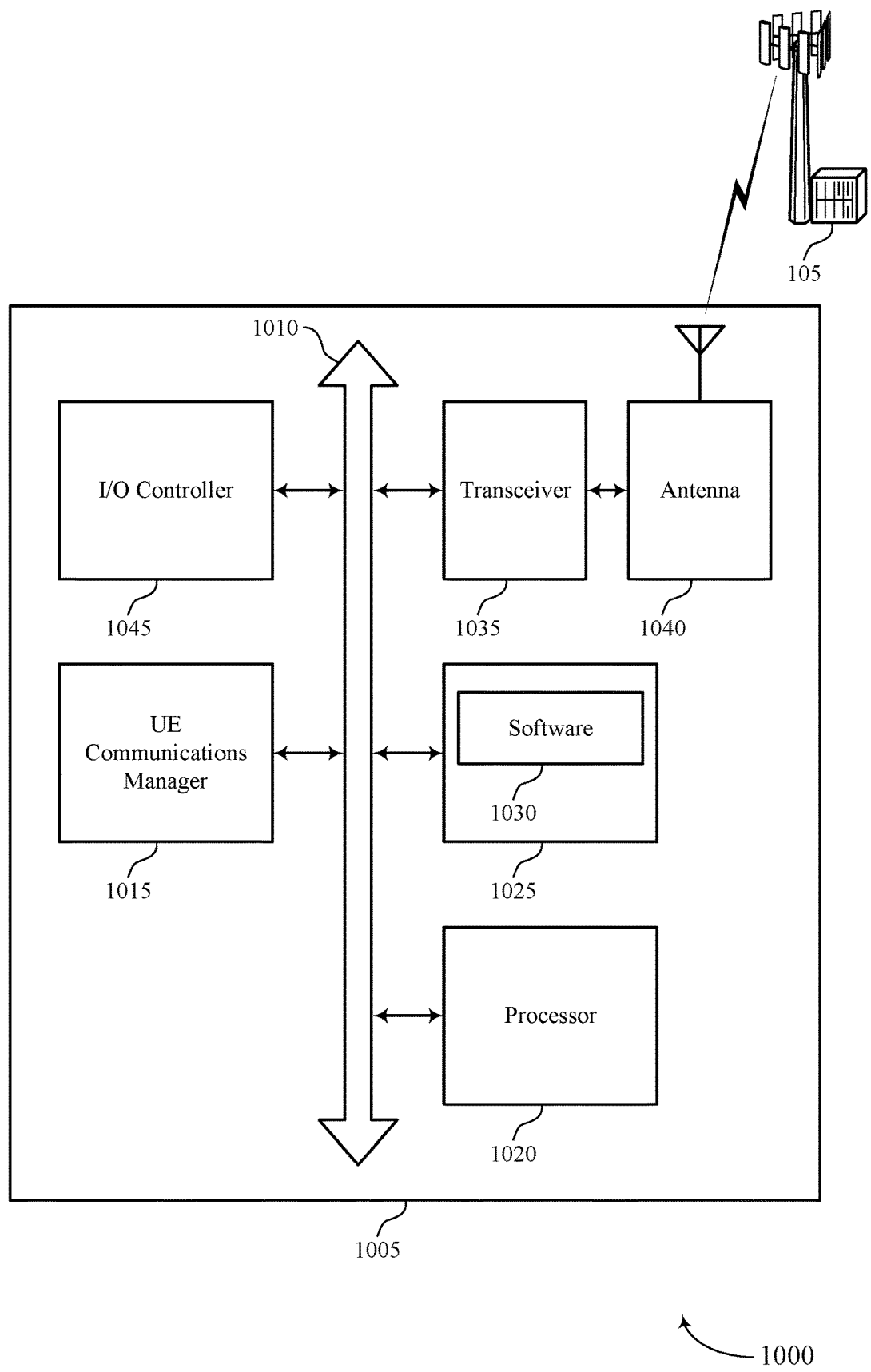
FIG. 10 illustrates a block diagram of a system including a user equipment (UE) that supports SS block and coreset multiplexing in accordance with various aspects of the present disclosure.

FIG. 10 shows a diagram of a system 1000 including a device 1005 that supports SS block and coreset multiplexing in accordance with various aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting SS block and coreset multiplexing).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support SS block and coreset multiplexing. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
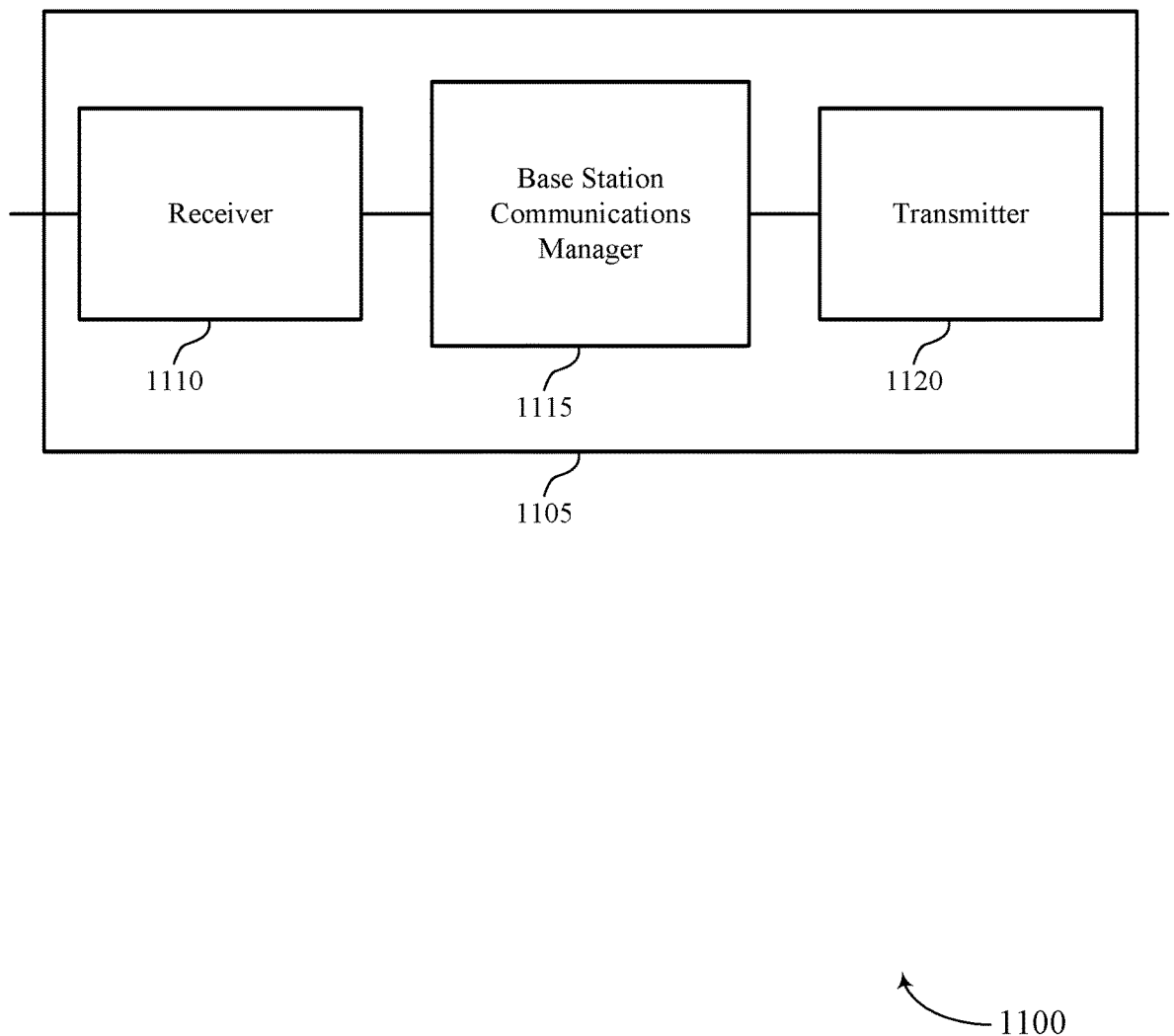
FIGS. 11 and 12 show block diagrams of a device that supports SS block and coreset multiplexing in accordance with various aspects of the present disclosure.

FIG. 11 shows a block diagram 1100 of a wireless device 1105 that supports SS block and coreset multiplexing in accordance with various aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to SS block and coreset multiplexing, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify an SS block to transmit to one or more UEs, the SS block including synchronization signals and a PBCH, identify control information to transmit to the one or more UEs in a control channel of a coreset, transmit the SS block including the synchronization signals and the PBCH, where the PBCH includes a coreset configuration indication which indicates a configuration of the coreset and a multiplexing indication which indicates whether the coreset and the SS block are time division multiplexed, frequency division multiplexed, or both, and transmit the control information to the UE in the control channel of the coreset.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
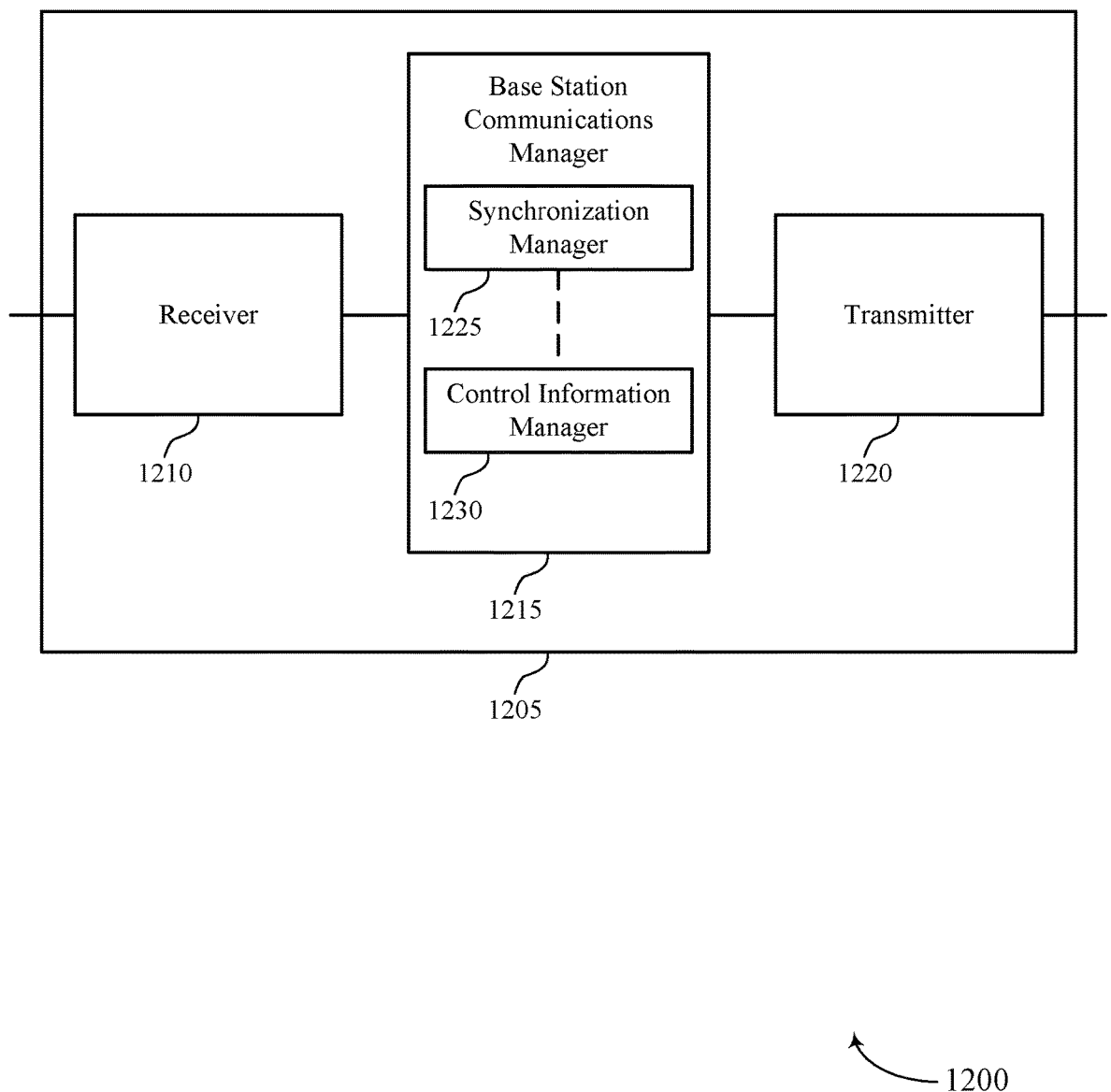

FIG. 12 shows a block diagram 1200 of a wireless device 1205 that supports SS block and coreset multiplexing in accordance with various aspects of the present disclosure.

Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to SS block and coreset multiplexing, etc.). Information may be passed on to other components of the device. The receiver 1210 may be an example of aspects of the transceiver 1335 described with reference to FIG. 13. The receiver 1210 may utilize a single antenna or a set of antennas.

Base station communications manager 1215 may be an example of aspects of the base station communications manager 1315 described with reference to FIG. 13. Base station communications manager 1215 may include synchronization manager 1225 and control information manager 1230.

Synchronization manager 1225 may identify an SS block to transmit to one or more UEs, the SS block including synchronization signals and a PBCH. In some cases, synchronization manager 1225 may transmit, in the PBCH, a relative position indication which indicates a relative position of the coreset in relation to the SS block when the multiplexing indication indicates that the coreset is frequency division multiplexed with the SS block. In some cases, synchronization manager 1225 may transmit the SS block including the synchronization signals and the PBCH, where the PBCH includes a coreset configuration indication which indicates a configuration of the coreset and a multiplexing indication which indicates whether the coreset and the SS block are time division multiplexed, frequency division multiplexed, or both.

In some cases, the multiplexing indication further indicates whether a data channel including RMSI for the one or more UEs and the SS block are time division multiplexed, frequency division multiplexed, or both. In some cases, the coreset configuration indicated by the coreset configuration indication corresponds to a type of multiplexing indicated by the multiplexing indication. In some cases, the relative position indication indicates whether the coreset is above or below the SS block in a frequency domain. In some cases, the multiplexing indication and the relative position indication are combined as a multi-bit indicator in the PBCH. In some cases, the coreset and the SS block are separated by a guard band. In some cases, the coreset and the SS block are associated with different numerologies. In some cases, a center frequency of the SS block is offset from a center frequency of the coreset by an integer number of resources blocks. In some cases, a configuration of a data channel including RMSI for the one or more UEs is based on the coreset configuration. In some cases, the coreset is adjacent to the SS block in a frequency domain.

Control information manager 1230 may identify control information to transmit to the one or more UEs in a control channel of a coreset and transmit the control information to the one or more UEs in the control channel of the coreset. In some cases, the control information indicates a location of a data channel including RMSI for the one or more UEs. In some cases, the location of the data channel is frequency offset from a location of another downlink channel to be used for communication with the one or more UEs. In some cases, the RMSI indicates the offset between the location of the data channel and the location of the other downlink channel. In some cases, the offset is between a center frequency of the data channel and a center frequency of the other downlink channel. In some cases, the offset is between a resource block at an edge of a bandwidth spanned by the data channel and a resource block at an edge of a bandwidth spanned by the other downlink channel.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1335 described with reference to FIG. 13. The transmitter 1220 may utilize a single antenna or a set of antennas.

Figure 13:
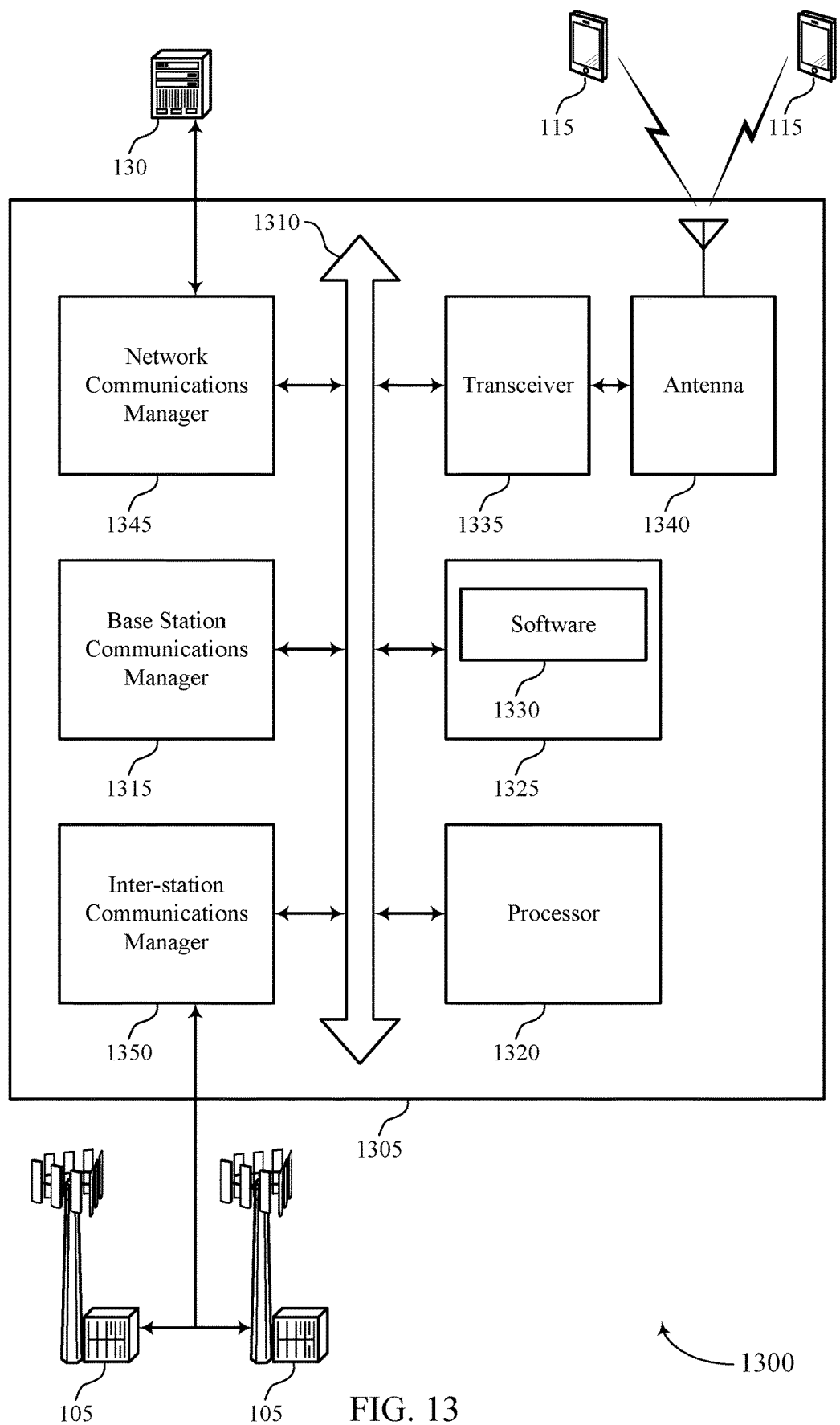
FIG. 13 illustrates a block diagram of a system including a base station that supports SS block and coreset multiplexing in accordance with various aspects of the present disclosure.

FIG. 13 shows a diagram of a system 1300 including a device 1305 that supports SS block and coreset multiplexing in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting SS block and coreset multiplexing).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support SS block and coreset multiplexing. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
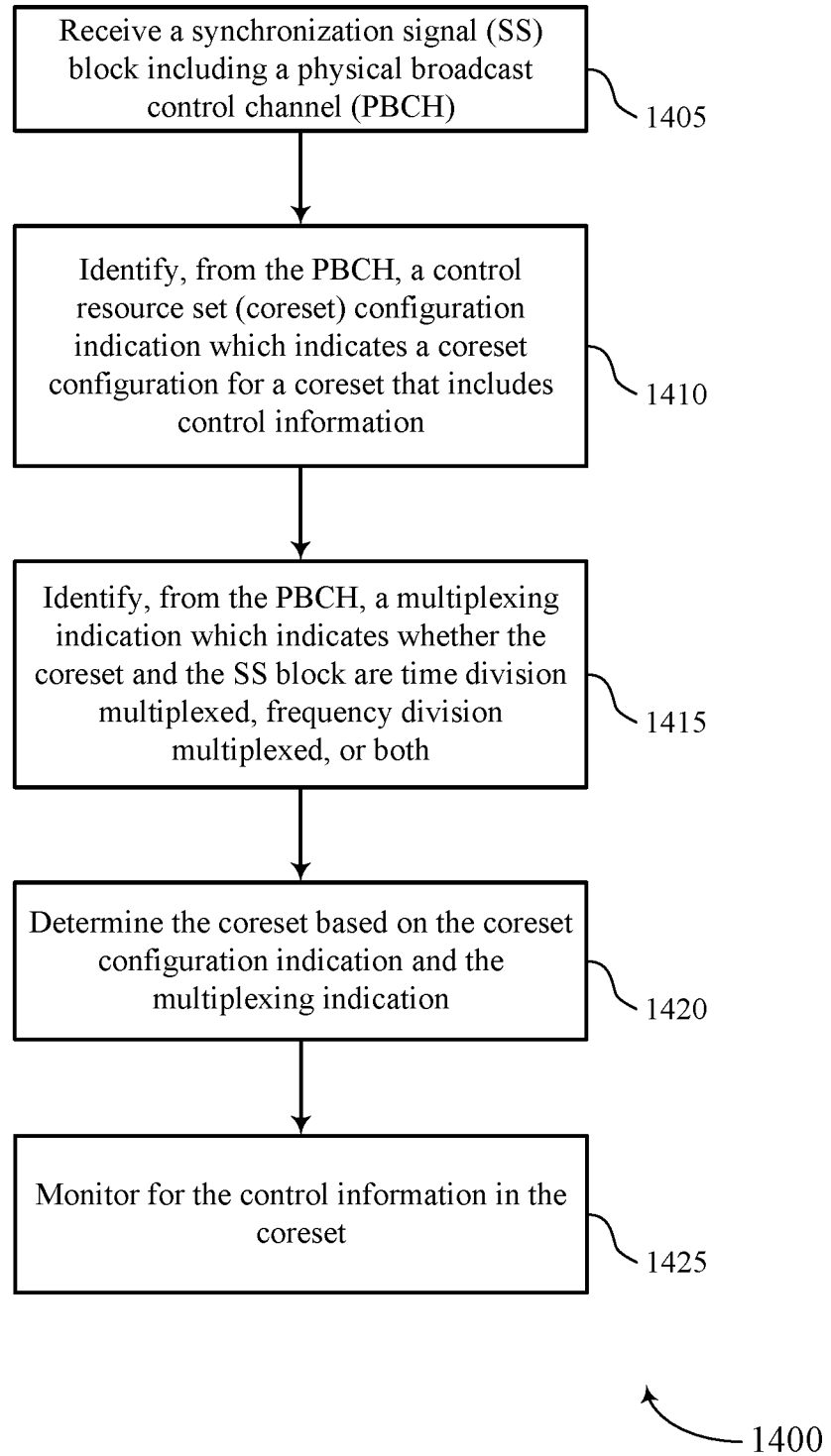
FIGS. 14 and 15 illustrate methods for SS block and coreset multiplexing in accordance with various aspects of the present disclosure.

FIG. 14 shows a flowchart illustrating a method 1400 for SS block and coreset multiplexing in accordance with various aspects of the present disclosure. The operations of method 1400 may be implemented by a UE 115 or its components as described herein. For example, the operations of method 1400 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive an SS block comprising a PBCH. The operations of block 1405 may be performed according to the methods described herein. In certain examples, aspects of the operations of block 1405 may be performed by a synchronization manager as described with reference to FIGS. 7 through 10.

At block 1410 the UE 115 may identify, from the PBCH, a coreset configuration indication which indicates a coreset configuration for a coreset that includes control information. The operations of block 1410 may be performed according to the methods described herein. In certain examples, aspects of the operations of block 1410 may be performed by a coreset configuration manager as described with reference to FIGS. 7 through 10.

At block 1415 the UE 115 may identify, from the PBCH, a multiplexing indication which indicates whether the coreset and the SS block are time division multiplexed, frequency division multiplexed, or both. The operations of block 1415 may be performed according to the methods described herein. In certain examples, aspects of the operations of block 1415 may be performed by a coreset locator as described with reference to FIGS. 7 through 10.

At block 1420 the UE 115 may determine the coreset based at least in part on the coreset configuration indication and the multiplexing indication. The operations of block 1420 may be performed according to the methods described herein. In certain examples, aspects of the operations of block 1420 may be performed by a coreset manager as described with reference to FIGS. 7 through 10.

At block 1425 the UE 115 may monitor for the control information in the coreset. The operations of block 1425 may be performed according to the methods described herein. In certain examples, aspects of the operations of block 1425 may be performed by a coreset manager or a control information manager as described with reference to FIGS. 7 through 10.

Figure 15:
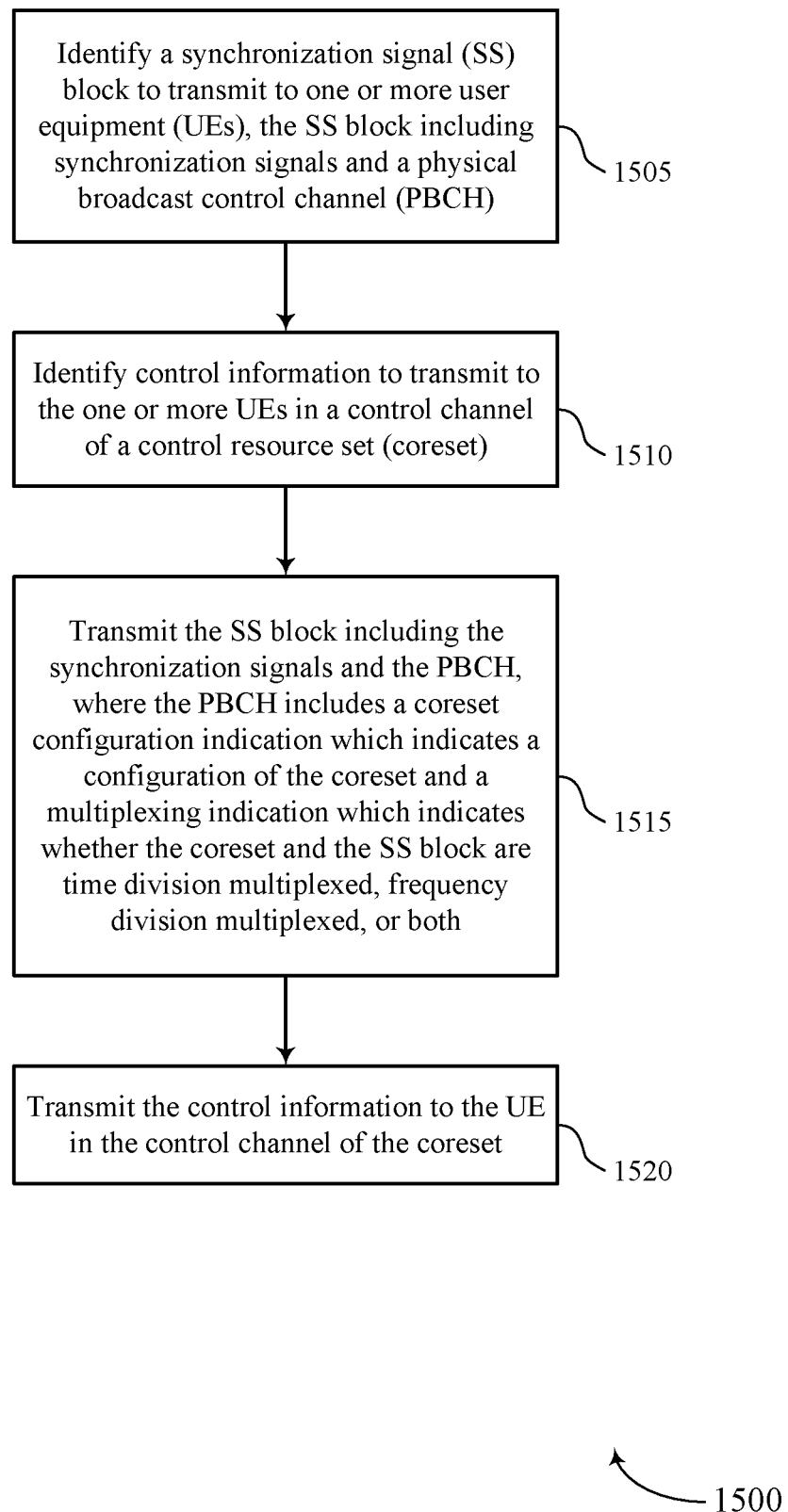

FIG. 15 shows a flowchart illustrating a method 1500 for SS block and coreset multiplexing in accordance with various aspects of the present disclosure. The operations of method 1500 may be implemented by a base station 105 or its components as described herein. For example, the operations of method 1500 may be performed by a base station communications manager as described with reference to FIGS. 11 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify an SS block to transmit to one or more UEs, the SS block comprising synchronization signals and a PBCH. The operations of block 1505 may be performed according to the methods described herein. In certain examples, aspects of the operations of block 1505 may be performed by a synchronization manager as described with reference to FIGS. 11 through 13.

At block 1510 the base station 105 may identify control information to transmit to the one or more UEs in a control channel of a coreset. The operations of block 1510 may be performed according to the methods described herein. In certain examples, aspects of the operations of block 1510 may be performed by a control information manager as described with reference to FIGS. 11 through 13.

At block 1515 the base station 105 may transmit the SS block comprising the synchronization signals and the PBCH, wherein the PBCH comprises a coreset configuration indication which indicates a configuration of the coreset and a multiplexing indication which indicates whether the coreset and the SS block are time division multiplexed, frequency division multiplexed, or both. The operations of block 1515 may be performed according to the methods described herein. In certain examples, aspects of the operations of block 1515 may be performed by a synchronization manager as described with reference to FIGS. 11 through 13.

At block 1520 the base station 105 may transmit the control information to the UE in the control channel of the coreset. The operations of block 1520 may be performed according to the methods described herein. In certain examples, aspects of the operations of block 1520 may be performed by a control information manager as described with reference to FIGS. 11 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a synchronization signal (SS) block comprising a physical broadcast channel (PBCH);
   identifying, from the PBCH, a control resource set (coreset) configuration indication which indicates a coreset configuration for a coreset that includes control information;
   identifying, from the PBCH, a multiplexing indication which indicates whether the coreset and the SS block are time division multiplexed, frequency division multiplexed, or both;
   determining the coreset based at least in part on the coreset configuration indication and the multiplexing indication; and
   monitoring for the control information in the coreset.

2. The method of claim 1, wherein determining the coreset further comprises:
   identifying a type of multiplexing indicated by the multiplexing indication; and
   identifying the coreset configuration that corresponds to the type of multiplexing.

3. The method of claim 1, wherein determining the coreset further comprises:
   identifying, based at least in part on the coreset configuration indication and the multiplexing indication, a location of the coreset; and
   determining the coreset based at least in part on identifying the location of the coreset.

4. The method of claim 1, wherein the coreset configuration indication comprises a relative position indication which indicates a relative position of the coreset in relation to the SS block when the multiplexing indication indicates that the coreset is frequency division multiplexed with the SS block.

5. The method of claim 4, wherein the relative position indication indicates whether the coreset is above or below the SS block in a frequency domain.

6. The method of claim 5, wherein the coreset and the SS block are separated by a guard band in the frequency domain.

7. The method of claim 6, wherein the coreset and the SS block are associated with different numerologies.

8. The method of claim 4, wherein the multiplexing indication and the relative position indication are combined into a multi-bit indicator in the PBCH.

9. The method of claim 4, wherein a center frequency of the SS block is offset from a center frequency of the coreset by an integer number of resources blocks, and wherein the relative position indication indicates the offset.

10. The method of claim 1, wherein the coreset is adjacent to the SS block in a frequency domain.

11. The method of claim 1, further comprising:
determining a location of remaining minimum system information (RMSI) in a data channel based at least in part on the control information.

12. The method of claim 11, wherein a location of the data channel is frequency offset from a location of another downlink channel to be used for communication with a base station.

13. The method of claim 12, wherein the RMSI indicates the offset between the location of the data channel and the location of the another downlink channel.

14. The method of claim 12, wherein the offset is between a center frequency of the data channel and a center frequency of the another downlink channel.

15. The method of claim 12, wherein the offset is between a resource block at an edge of a bandwidth spanned by the data channel and a resource block at an edge of a bandwidth spanned by the another downlink channel.

16. The method of claim 1, further comprising:
determining a configuration of a data channel comprising remaining minimum system information (RMSI) based at least in part on the coreset configuration.

17. The method of claim 1, wherein the multiplexing indication further indicates whether a data channel comprising remaining minimum system information (RMSI) is time division multiplexed, frequency division multiplexed, or both with the SS block.

18. The method of claim 1, further comprising:
identifying a location of a control channel in the coreset, the control channel comprising the control information; and
processing the control information in the control channel based at least in part on identifying the location of the control channel in the coreset.

19. A method for wireless communication at a base station, comprising:
identifying a synchronization signal (SS) block to transmit to one or more user equipment (UEs), the SS block comprising synchronization signals and a physical broadcast channel (PBCH);
identifying control information to transmit to the one or more UEs in a control channel of a control resource set (coreset);
transmitting the SS block comprising the synchronization signals and the PBCH, wherein the PBCH comprises a coreset configuration indication which indicates a configuration of the coreset and a multiplexing indication which indicates whether the coreset and the SS block are time division multiplexed, frequency division multiplexed, or both; and
transmitting the control information to the one or more UEs in the control channel of the coreset.

20. The method of claim 19, wherein the coreset configuration indication comprises a relative position indication which indicates a relative position of the coreset in relation to the SS block when the multiplexing indication indicates that the coreset is frequency division multiplexed with the SS block.

21. The method of claim 20, wherein the relative position indication indicates whether the coreset is above or below the SS block in a frequency domain.

22. The method of claim 20, wherein the multiplexing indication and the relative position indication are combined as a multi-bit indicator in the PBCH.

23. A mobile device for wireless communication, comprising:
a processor, memory in electronic communication with the processor; and
instructions stored in the memory and executable by the processor to cause the mobile device to:
receive a synchronization signal (SS) block comprising a physical broadcast channel (PBCH);
identify, from the PBCH, a control resource set (coreset) configuration indication which indicates a coreset configuration for a coreset that includes control information;
identify, from the PBCH, a multiplexing indication which indicates whether the coreset and the SS block are time division multiplexed, frequency division multiplexed, or both;
determine the coreset based at least in part on the coreset configuration indication and the multiplexing indication; and
monitor for the control information in the coreset.

24. The mobile device of claim 23, wherein the instructions to determine the coreset further are executable by the processor to cause the mobile device to:
identify a type of multiplexing indicated by the multiplexing indication; and
identify the coreset configuration that corresponds to the type of multiplexing.

25. The mobile device of claim 23, wherein the instructions to determine the coreset further are executable by the processor to cause the mobile device to:
identify, based at least in part on the coreset configuration indication and the multiplexing indication, a location of the coreset; and
determine the coreset based at least in part on identifying the location of the coreset.

26. The mobile device of claim 23, wherein the coreset configuration indication comprises a relative position indication that indicates whether the coreset is above or below the SS block in a frequency domain when the multiplexing indication indicates that the coreset is frequency division multiplexed with the SS block.

27. The mobile device of claim 26, wherein a center frequency of the SS block is offset from a center frequency of the coreset by an integer number of resources blocks, and wherein the relative position indication indicates the offset.

28. The mobile device of claim 23, wherein the instructions are further executable by the processor to cause the mobile device to:

determine a location of remaining minimum system information (RMSI) in a data channel based at least in part on the control information.

29. The mobile device of claim 23, wherein the instructions are further executable by the processor to cause the mobile device to:

determine a configuration of a data channel comprising remaining minimum system information (RMSI) based at least in part on the coreset configuration.

30. A network device for wireless communication at a base station, comprising:

a processor, memory in electronic communication with the processor; and instructions stored in the memory and executable by the processor to cause the network device to:

identify a synchronization signal (SS) block to transmit to one or more user equipment (UEs), the SS block comprising synchronization signals and a physical broadcast channel (PBCH);

identify control information to transmit to the one or more UEs in a control channel of a control resource set (coreset);

transmit the SS block comprising the synchronization signals and the PBCH, wherein the PBCH comprises a coreset configuration indication which indicates a configuration of the coreset and a multiplexing indication which indicates whether the coreset and the SS block are time division multiplexed, frequency division multiplexed, or both; and transmit the control information to the one or more UEs in the control channel of the coreset.

* * * * *